United States Patent
Vesely

(10) Patent No.: US 9,299,183 B2
(45) Date of Patent: Mar. 29, 2016

(54) DETECTION OF PARTIALLY OBSCURED OBJECTS IN THREE DIMENSIONAL STEREOSCOPIC SCENES

(71) Applicant: zSpace, Inc., Sunnyvale, CA (US)

(72) Inventor: Michael A. Vesely, Santa Cruz, CA (US)

(73) Assignee: zSpace, Inc., Sunnyvale, CA (US)

(*) Notice: Subject to any disclaimer, the term of this patent is extended or adjusted under 35 U.S.C. 154(b) by 186 days.

(21) Appl. No.: 14/198,252

(22) Filed: Mar. 5, 2014

(65) Prior Publication Data

US 2014/0184589 A1 Jul. 3, 2014

Related U.S. Application Data

(63) Continuation of application No. 13/174,448, filed on Jun. 30, 2011, now abandoned.

(60) Provisional application No. 61/361,081, filed on Jul. 2, 2010, provisional application No. 61/364,277, filed on Jul. 14, 2010.

(51) Int. Cl.

| | | |
|---|---|---|
| *G06T 15/08* | (2011.01) | |
| *G06F 3/01* | (2006.01) | |
| *G06F 3/0346* | (2013.01) | |
| *G06F 3/0481* | (2013.01) | |
| *G06F 3/0482* | (2013.01) | |
| *G06F 3/0485* | (2013.01) | |
| *H04N 13/04* | (2006.01) | |

(52) U.S. Cl.
CPC .............. *G06T 15/08* (2013.01); *G06F 3/012* (2013.01); *G06F 3/013* (2013.01); *G06F 3/0346* (2013.01); *G06F 3/0482* (2013.01); *G06F 3/0485* (2013.01); *G06F 3/04815* (2013.01); *H04N 13/0484* (2013.01)

(58) Field of Classification Search
None
See application file for complete search history.

(56) References Cited

U.S. PATENT DOCUMENTS

| | | |
|---|---|---|
| 5,175,616 A | 12/1992 | Milgram et al. |
| 5,574,836 A | 11/1996 | Broemmelsiek |
| 5,914,717 A | 6/1999 | Kleewein et al. |
| 6,031,519 A | 2/2000 | O'Brien |
| 6,064,354 A | 5/2000 | DeLuca |
| 6,115,025 A | 9/2000 | Buxton et al. |
| 6,388,639 B1 | 5/2002 | Hoshino et al. |

(Continued)

OTHER PUBLICATIONS

Bowman, Doug A.; Kruijff, Ernst; LaViola, Jr., Joseph J.; Poupyrev, Ivan; "An Introduction to 3-D User Interface Design," Presence Magazine, vol. 10, No. 1; Feb. 2001, pp. 96-108 (13 pages).

(Continued)

*Primary Examiner* — Barry Drennan
*Assistant Examiner* — Jason Pringle-Parker
(74) *Attorney, Agent, or Firm* — Meyertons Hood Kivlin Kowert & Goetzel, P.C.; Jeffrey C. Hood; Brian E. Moore

(57) ABSTRACT

System and methods for user interface elements for use within a 3D scene. The 3D scene may be presented by at least one display, which includes displaying at least one stereoscopic image of the 3D scene by the display(s). The 3D scene may be presented according to a first viewpoint. One or more user interface elements may be used. The 3D scene may be updated in response to the use of the user interface elements.

25 Claims, 30 Drawing Sheets

(56) References Cited

U.S. PATENT DOCUMENTS

| | | | |
|---|---|---|---|
| 6,727,924 B1 | 4/2004 | Anderson | |
| 6,752,498 B2 | 6/2004 | Covannon et al. | |
| 6,753,847 B2 | 6/2004 | Kurtenbach et al. | |
| 6,842,175 B1 | 1/2005 | Schmalstieg et al. | |
| 7,043,695 B2 | 5/2006 | Elber et al. | |
| 7,098,872 B2 | 8/2006 | Geng | |
| 7,324,085 B2 * | 1/2008 | Balakrishnan | G02B 27/2271 345/156 |
| 7,447,999 B1 | 11/2008 | Robertson et al. | |
| 7,526,384 B2 | 4/2009 | MacIntosh et al. | |
| 7,528,830 B2 | 5/2009 | Redert | |
| 7,541,566 B2 | 6/2009 | Pihlaja | |
| 7,554,541 B2 | 6/2009 | Fitzmaurice et al. | |
| 7,557,816 B2 | 7/2009 | Kuroki | |
| 7,731,495 B2 | 6/2010 | Eisenberg et al. | |
| 7,739,623 B2 | 6/2010 | Liang et al. | |
| 7,750,911 B2 | 7/2010 | Bae | |
| 7,774,695 B2 | 8/2010 | Kobylinski | |
| 7,830,377 B1 | 11/2010 | Desimone et al. | |
| 7,881,901 B2 | 2/2011 | Fein et al. | |
| 7,907,167 B2 | 3/2011 | Vesely et al. | |
| 7,913,185 B1 | 3/2011 | Benson et al. | |
| 7,986,318 B2 * | 7/2011 | Kurtenbach | G02B 27/2271 345/156 |
| 8,232,990 B2 | 7/2012 | King et al. | |
| 8,384,665 B1 | 2/2013 | Powers, III et al. | |
| 8,471,812 B2 | 6/2013 | Bunch | |
| 2001/0017649 A1 * | 8/2001 | Yaron | A61B 1/00193 348/45 |
| 2006/0026533 A1 * | 2/2006 | Napoli | G06F 3/04815 715/850 |
| 2006/0051073 A1 | 3/2006 | Jung et al. | |
| 2007/0279436 A1 * | 12/2007 | Ng | G06T 19/00 345/624 |
| 2008/0030461 A1 | 2/2008 | Matsui et al. | |
| 2008/0036738 A1 * | 2/2008 | Balakrishnan | G02B 27/2271 345/158 |
| 2009/0091708 A1 | 4/2009 | Greene | |
| 2011/0010666 A1 | 1/2011 | Choi | |
| 2011/0029907 A1 | 2/2011 | Bakhash | |
| 2011/0107270 A1 * | 5/2011 | Wang | G06F 19/3437 715/850 |

OTHER PUBLICATIONS

Schkolne, Steven; "Drawing with the Hand in Free Space: Creating Organic 3d Shapes with Gesture in a Semi-Immersive Environment," Leonardo Magazine, Aug. 2002 (6 pages).

Lang, Dustin; Findlater, Leah; Shaver, Michael; "CoolPaint: Direct Interaction Painting," Proceedings of the 16th Annual ACM Symposium on User Interface Software and Technology (UIST), 2003 (2 pages).

"SolidWorks Tech Tips—Sketching," Retrieved Aug. 4, 2011 <http://capinc.com/support/tips/solidworks-tech-tips-sketching> (5 pages).

Frohlich, Bernd et al., "Physically-Based Manipulation on the Responsive Workbench," VR '00 Proceedings of the IEEE Virtual Reality 2000 Conference; Mar. 2000, pp. 5-11; IEEE Computer Society, Washington, DC, U.S.A. (7 pages).

Frohlich, Bernd et al., "The Responsive Workbench: A Virtual Working Environment for Physicians," Computers in Biology and Medicine, vol. 25, No. 2, Mar. 1995, pp. 301-308 (8 pages).

Hinckley, Ken et al., "A Survey of Design Issues in Spatial Input," Proceedings of ACM UIST Symposium on User Interface Software & Technology, Nov. 2-4, 1994, pp. 213-222 (10 pages).

Clark, James H., "Graphics and Image Processing: Designing Surfaces in 3-D," Communications of the ACM, vol. 19, No. 8, Aug. 1976, pp. 454-460 (7 pages).

Cutler, Lawrence D. et al., "Two-Handed Direct Manipulation on the Responsive Workbench," Proceedings of the 1997 Symposium on Interactive 3D Graphics, Apr. 30, 1997; pp. 107-114, ACM, New York, New York U.S.A. (9 pages).

Serra, Luis et al., "Interaction Techniques for a Virtual Workspace," (ICAT/VRST'95) Proceedings of ACM Virtual Reality Software and Technology, 1995, Chiba, Japan (11 pages).

Shaw, Chris; Green, Mark; "Two-Handed Polygonal Surface Design," ACM symposium on User Interface Software and Technology (UIST), Nov. 2-4, 1994, pp. 205-212 (8 pages).

Wikibooks.Org "Section 218.3.16. Selecting Obscured or Hidden Objects" Blender: 3D Content Creation Noob to Pro, licensed Apr. 28, 2012, retrieved from <http://upload.wikimedia.org/wikipedia/commons/c/c1/BlenderDocumentation.pdf>; Cover pp. 1-2 and p. 1571 (3 pages).

Huh, Kyung-Moo, et al., "A Viewpoint-Dependent Autostereoscopic 3D Display Method," ISIE 2011, Proceedings of the IEEE International Symposium on Industrial Electronics, vol. 1; pp. 95-100, Pusan, Korea (6 pages).

Das, Kaushik, et al., "An Evaluation of Menu Properties and Point Techniques in a Projection-based VR Environment", IEEE Symposium on 3D User Interfaces 2010, Waltham, Massachusetts, Mar. 20-21, 2010; pp. 47-50 (4 pages).

Kim, Namgyu, et al., "Multimodal Menu Presentation and Selection in Immersive Virtual Environments", POSTECH, Korea, Feb. 11, 2005, pp. 1-8 (8 pages).

* cited by examiner

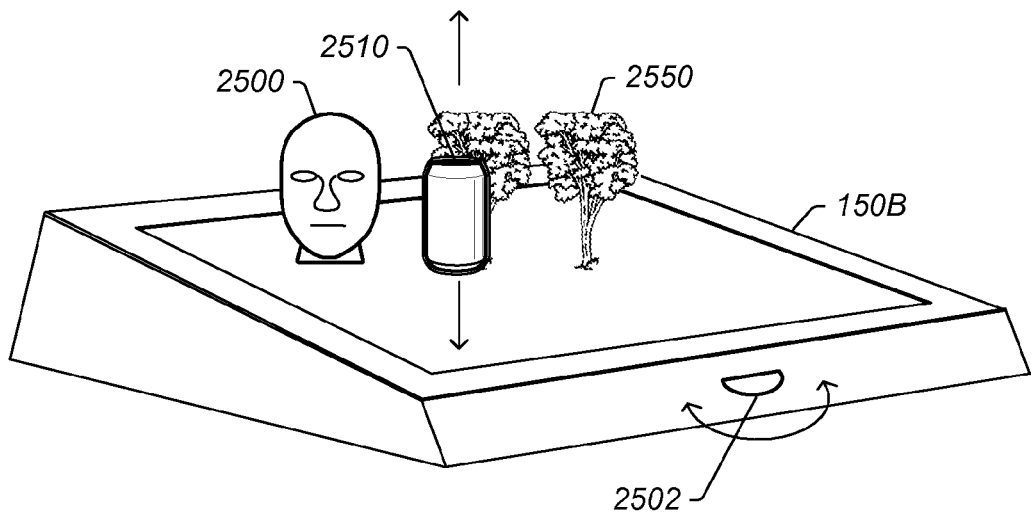
FIG. 25
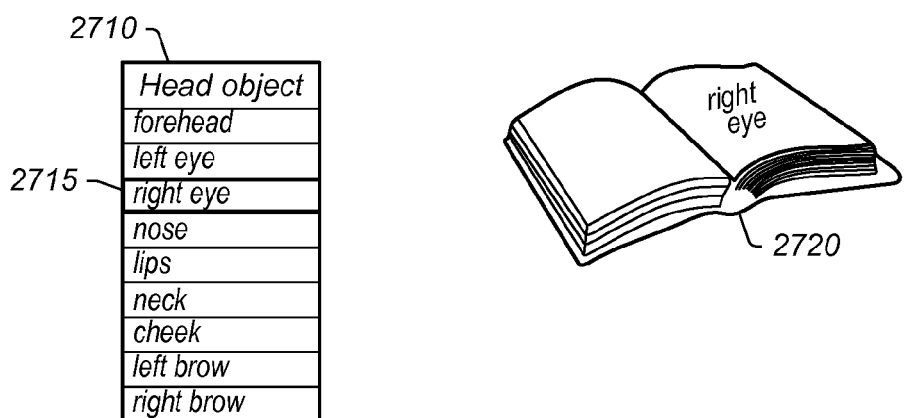
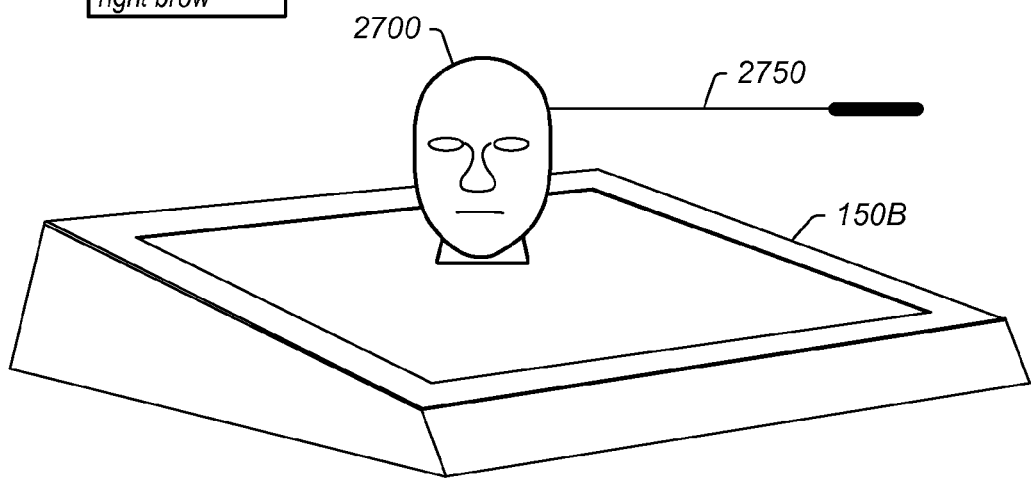
FIG. 27

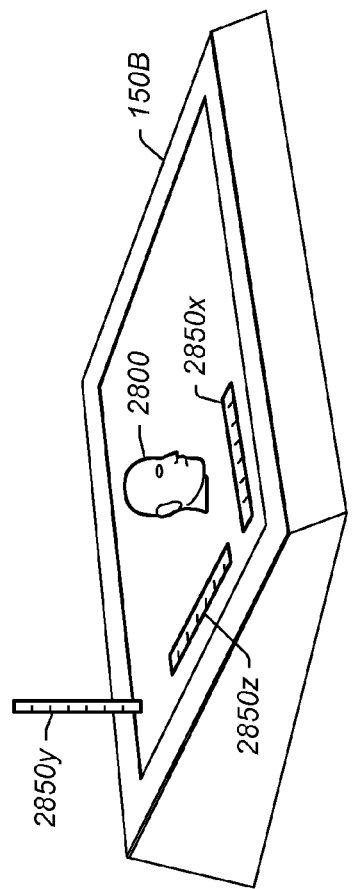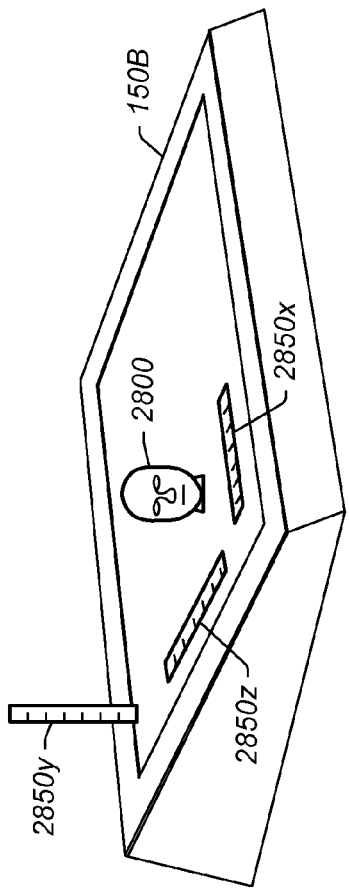

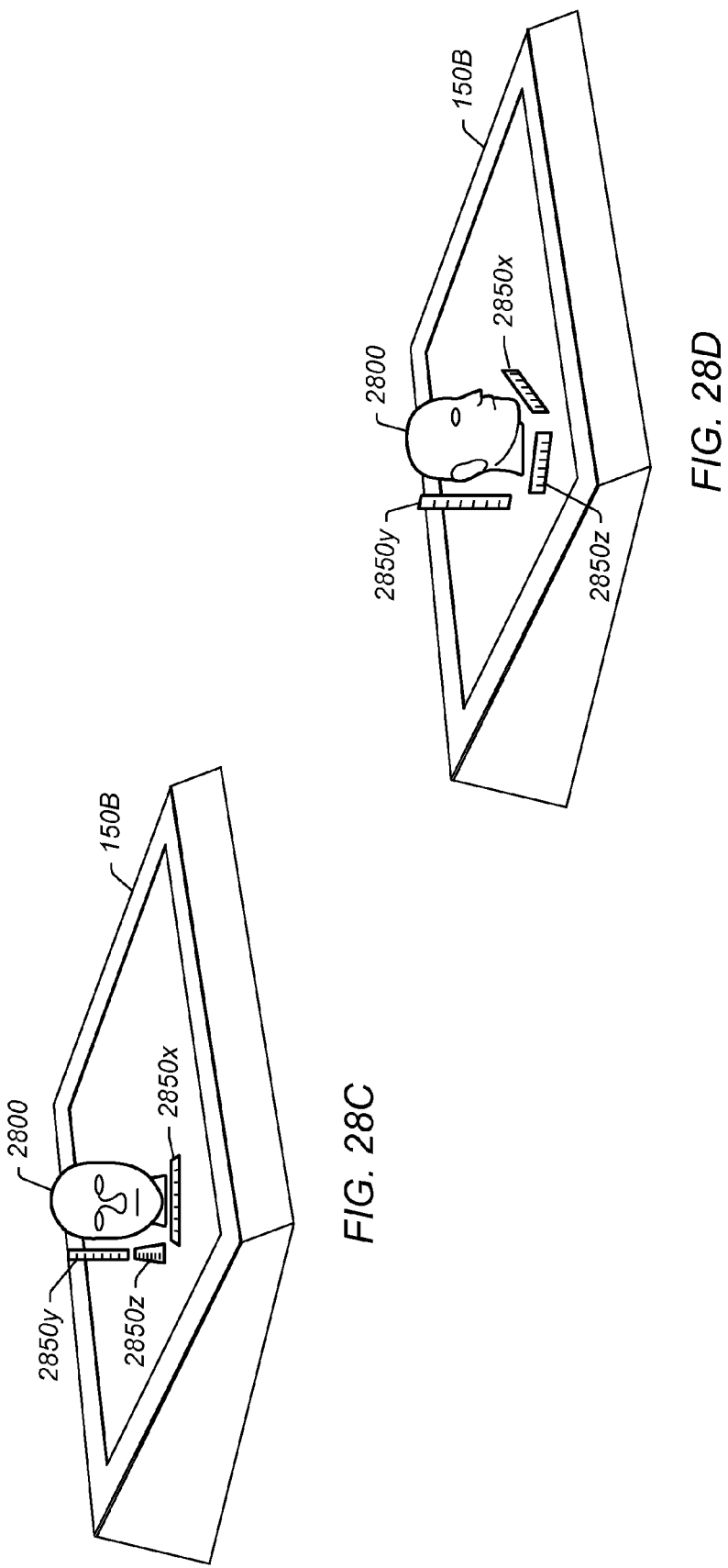

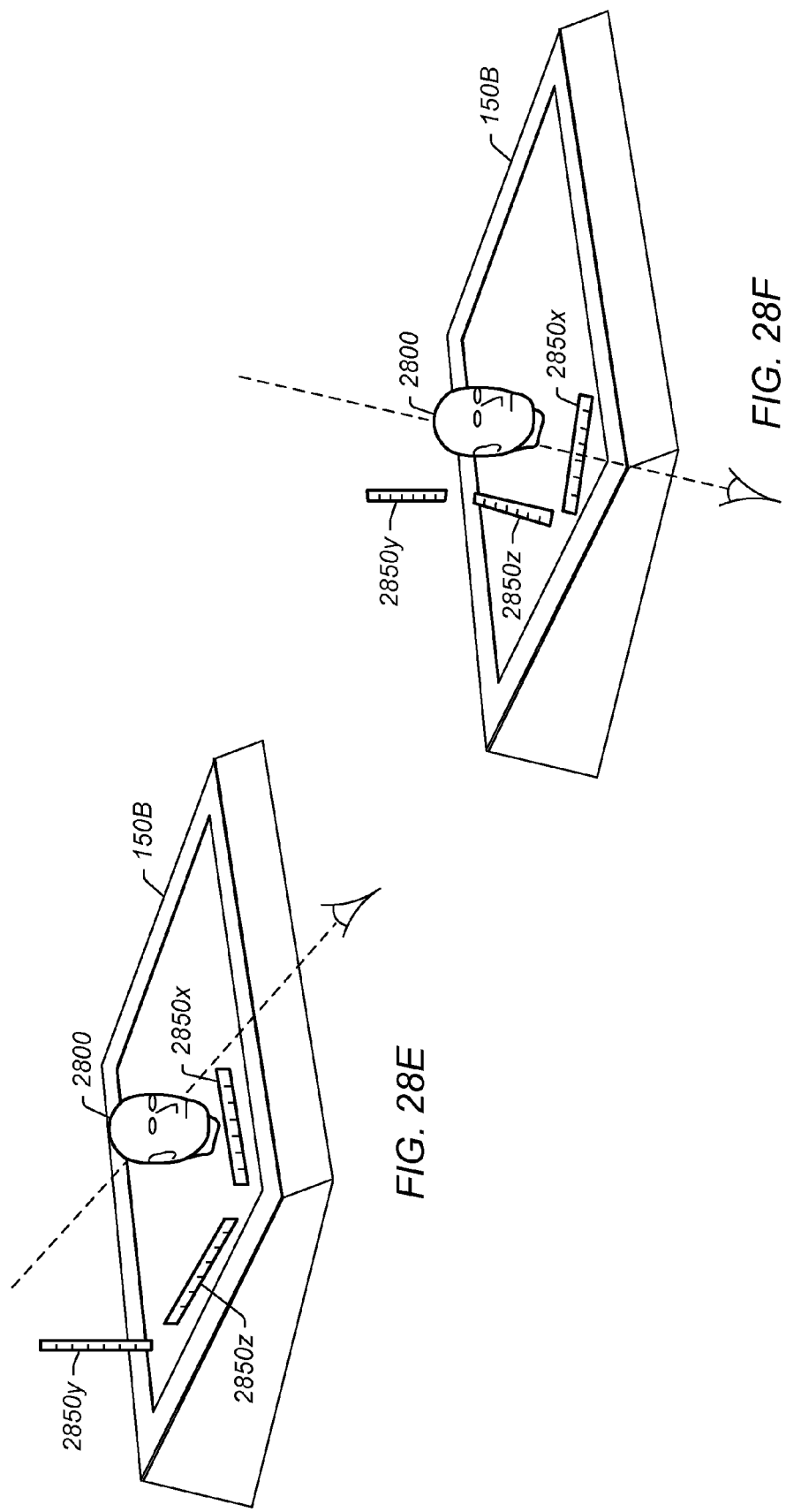

DETECTION OF PARTIALLY OBSCURED OBJECTS IN THREE DIMENSIONAL STEREOSCOPIC SCENES

PRIORITY DATA

This application is a continuation of U.S. patent application Ser. No. 13/174,448 titled "User Interface Elements for Use within a Three Dimensional Scene" filed Jun. 30, 2011 whose inventor was Michael A. Vesely, incorporated by reference in its entirety as though fully and completely set forth herein, and which claims benefit of priority of U.S. provisional application Ser. No. 61/361,081 titled "User Interface Elements for use within a Three Dimensional Scene" filed Jul. 2, 2010, whose inventors were Michael A. Vesely, Edward Sesek, Slan S. Gray, Peter F. Ullmann, Craig Upson, Steven C. Hess, and Scott Harris, and U.S. provisional application Ser. No. 61/364,277, titled "Tools for use within a Three Dimensional Scene", filed Jul. 14, 2010, whose inventors are Michael A. Vesely, Michael C. Albers, Alan S. Gray, Scott Harris, Steven C. Hess, Baifang Lu, Edward M. Sesek, Peter F. Ulmann, and Craig Upson, both of which are hereby incorporated by reference in its entirety as though fully and completely set forth herein.

FIELD OF THE INVENTION

The present invention relates to the field of three dimensional graphics, and more particularly to improved user interface elements for use within a three dimensional scene.

DESCRIPTION OF THE RELATED ART

Three dimensional (3D) capable computing devices and real-time computer-generated 3D computer graphics have been a popular area of computer science for the past few decades, with innovations in visual, audio and tactile systems. Much of the research in this area has produced hardware and software products that are specifically designed to generate greater realism and more natural computer-human interfaces. These innovations have significantly enhanced and simplified the user's computing experience.

However, additional tools and improvements to the realm of 3D systems are desired.

SUMMARY OF THE INVENTION

Various embodiments are presented of a system and method for improved user interface elements for use within a three dimensional scene.

A 3D scene may be presented by at least one display. More particularly, one or more stereoscopic images of the 3D scene may be presented by the display(s), e.g., by one or more stereoscopic displays. The 3D scene may be presented according to a first viewpoint. For example, the first viewpoint may be based on an eyepoint of a user viewing the 3D scene. In one embodiment, the method may include determining the first viewpoint, e.g., by determining the eyepoint of the user viewing the 3D scene. The method may determine the eyepoint of the user using various techniques, such as a position input device (e.g., glasses which provide eyepoint position information), triangulation, head/eye tracking, etc. Accordingly, the 3D scene may be rendered such that user can view the 3D scene with minimal distortions (e.g., since it is based on the eyepoint of the user).

As indicated above, the 3D scene may be presented by a single display or a plurality of displays. In one embodiment, the 3D scene may be presented by a vertical display and a horizontal display. For example, the vertical display may present a first stereoscopic image, e.g., according to a vertical perspective, and the horizontal display may present a second stereoscopic image, e.g., according to a horizontal perspective. These two stereoscopic images may form the 3D scene. In further embodiments, the two displays may be joined by a curvilinear or blending display, which may also present a stereoscopic image. The stereoscopic image of the blending display may operate to blend the stereoscopic images of the vertical and horizontal displays. Other numbers and types of displays are contemplated for presenting the 3D scene.

At least a portion of the 3D scene may be presented in "open space" in front of or otherwise outside of the at least one display. Thus, as indicated above, at least a portion of the 3D scene may appear as a hologram above the surface of the display. Thus, the user can directly interact with objects (displayed virtual objects) in the open space because they co-inhabit physical space proximate to the user. The inner volume is located behind the viewing surface, and portions of the 3D scene within this inner volume appear "inside" the physical viewing device. Thus, objects of the 3D scene presented within the inner volume do not share the same physical space with the user, and the objects therefore cannot be directly manipulated by hands or hand-held tools. That is, objects displayed within the inner volume may be manipulated indirectly, e.g., via a computer mouse or a joystick.

The method may further include receiving user input using one or more tools or user interface elements described herein. The 3D scene may be updated based on the user input using the one or more tools or user interface elements described herein.

BRIEF DESCRIPTION OF THE DRAWINGS

A better understanding of the present invention can be obtained when the following detailed description of the preferred embodiment is considered in conjunction with the following drawings, in which:

FIGS. 7-28F illustrate various user interface elements and their uses according to various embodiments of the invention;

Figure 1:
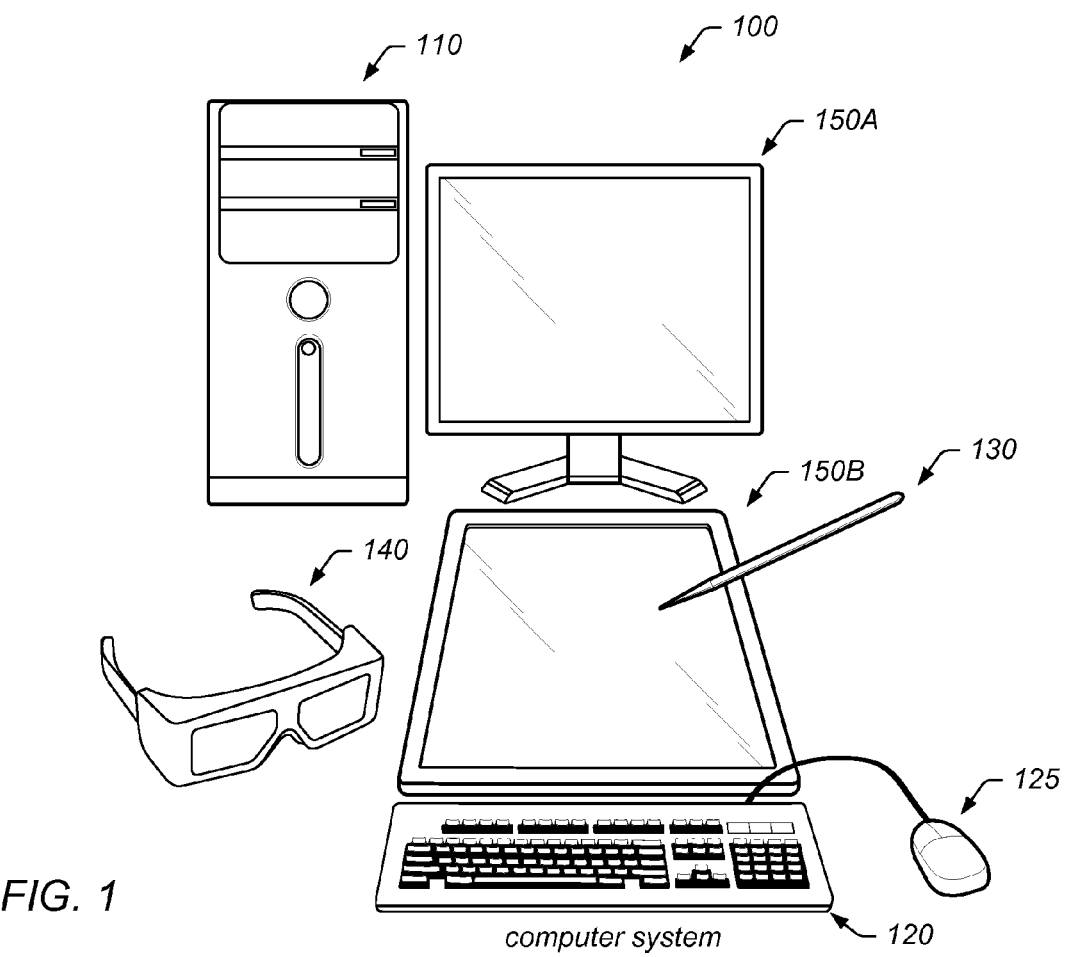
FIGS. 1 and 2 illustrate exemplary systems configured to implement various embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. patent application Ser. No. 11/098,681 (U.S. Patent Publication No. 2005/0219694), titled "Horizontal Perspective Display", filed on Apr. 4, 2005.

U.S. patent application Ser. No. 11/141,649 (U.S. Patent Publication No. 2005/0264858), titled "Multi-plane Horizontal Perspective Display", filed on May 31, 2005.

U.S. patent application Ser. No. 12/797,958, titled "Presenting a View within a Three Dimensional Scene", filed on Jun. 10, 2010, whose inventors are Michael A. Vesely and Alan S. Gray.

U.S. patent application Ser. No. 13/019,384, titled "Modifying Perspective of Stereoscopic Images Based on Changes in User Viewpoint", filed on Feb. 2, 2011, whose inventors are Michael A. Vesely, Nancy L. Clemens, and Alan S. Gray.

Terms

The following is a glossary of terms used in the present application:

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Viewpoint—this term has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below). The term "virtual viewpoint" refers to a viewpoint from within a virtual representation or 3D scene.

Eyepoint—the physical of a single eye or a pair of eyes. A viewpoint above may correspond to the eyepoint of a person. For example, a person's eyepoint has a corresponding viewpoint.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene (e.g., which sustains a normalized perspective of the user to the normalized display surface). A vertical perspective may be a central perspective, e.g., having a central vanishing point. In a vertical perspective, the viewpoint may have a line of site parallel to the ground plane (e.g., floor) and towards a display surface that is perpendicular to the ground plane. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints. The term "perpendicular perspective" may also refer to the definition above.

Horizontal Perspective—a perspective which is rendered from a viewpoint which is not perpendicular to the display surface. More particularly, the term "horizontal perspective" refers to a perspective which is rendered using a substantially 45 degree angled render plane in reference to the corresponding viewpoint. The rendering may be intended for a display which may be positioned horizontally (e.g., parallel to a ground plane, e.g. table or floor) in reference to a standing viewpoint perspective. "Substantially 45 degrees" may refer to 45 degrees or variations thereof, such as 44 and 46 degrees, 40-50 degrees, or any variation which may cause minimal distortion of the rendered scene (e.g., which sustains the appropriate angled projection of the image within the rendered scene). In a horizontal perspective, a display surface may be parallel to the ground plane, but may be some angle off parallel to the ground plane in either the horizontal or vertical direction. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints. The term "oblique perspective" may also refer to the definition above.

Automatically—refers to an action or operation performed by a computer system (e.g., software executed by the computer system), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
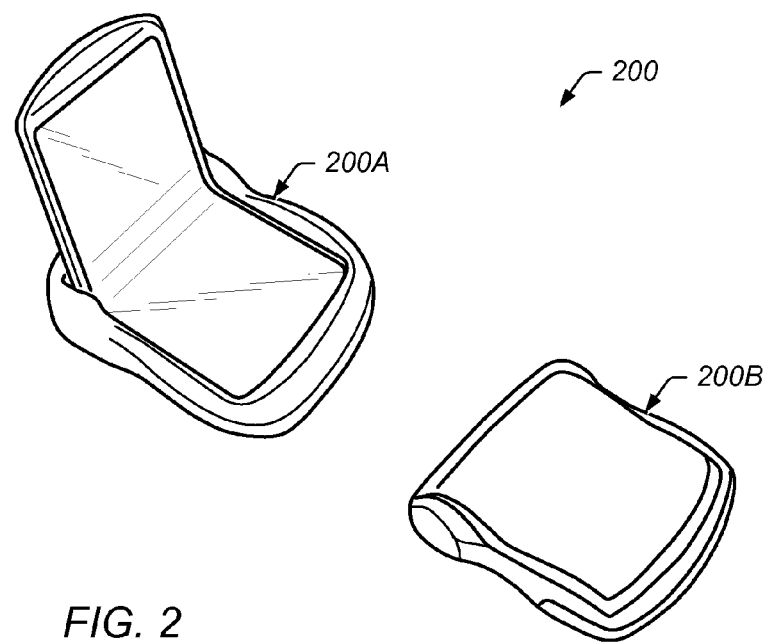

FIGS. 1 and 2—Exemplary Systems

FIGS. 1 and 2 illustrate exemplary systems which are configured to perform various embodiments described below.

In the embodiment of FIG. 1, computer system 100 may include chassis 110, display 150A and display 150B (which may collectively be referred to as display 150 or "at least one display" 150), keyboard 120, mouse 125, stylus 130, and glasses 140. In one embodiment, at least one of the displays 150A and 150B is a stereoscopic display. For example, in one embodiment, both of the displays 150A and 150B are stereoscopic displays. The displays 150A and 150B may be closely positioned to each other, e.g., where they abut. The angle formed between the displays may be any of various angles, e.g., 90 degrees, 110 degrees, etc.

The chassis 110 may include various computer components such as processors, memory mediums (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform the methods described herein. The memory medium may also store data (e.g., a computer model) representing a virtual space, which may be used for projecting a 3D scene of the virtual space via the display(s) 150. The memory medium may further store software for presenting the various user interface elements described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images) using the display 150A and/or the display 150B. The computer system 100 may also be configured to display or present user interface elements, e.g., within the 3D scene using the display 150A, the display 150B, and/or another display, as described in more detail below.

It should be noted that the embodiment of FIG. 1 is exemplary only, and other numbers of displays are envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided in more detail below. Additionally, while the displays 150 are shown as flat panel displays, they may be any type of system which is capable of displaying images, e.g., projection systems.

Either or both of the displays 150A and 150B may present (display) stereoscopic images for viewing by the user. By presenting stereoscopic images, the display(s) 150 may present a 3D scene for the user. This 3D scene may be referred to as an illusion since the actual provided images are two dimensional (2D), but the scene is conveyed in 3D via the user's interpretation of the provided images. In order to properly view the stereoscopic images (one for each eye), the user may wear the glasses 140 (although using some displays, glasses may not be necessary). The glasses 140 may be anaglyph glasses, polarized glasses, shuttering glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shuttering glasses, each lens is synchronized to alternations of left and right eye images provided by the display(s) 150. The display(s) 150 may provide both polarizations simultaneously or in an alternating manner (e.g., sequentially), as desired. Thus, the left eye is allowed to only see left eye images during the left eye image display time and the right eye is allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

In one embodiment, the glasses 140 may be used as a position input device to track the eyepoint of a user viewing a 3D scene presented by the system 100. For example, the glasses 140 may provide information that is usable to determine the position of the eyepoint(s) of the user, e.g., via triangulation. The position input device can include an infrared detection system to detect the position the viewer's head to allow the viewer freedom of head movement or use a light sensitive detection system. Other embodiments of the input device can be the triangulation method of detecting the viewer eyepoint location, such as a camera (e.g., a CCD camera) providing position data suitable for the head tracking objectives of the invention. The input device can be manually operated by the viewer, such as a keyboard, mouse, trackball, joystick, or the like, to indicate the correct display of the horizontal perspective display images. However, any method for tracking the position of the user's head or eyepoint is envisioned. Accordingly, the 3D scene may be rendered such that user can view the 3D scene with appropriately modified projection skewing (e.g., since it is based on the eyepoint of the user). Thus, the 3D scene may be particularly rendered for the eyepoint of the user, using the position input device. In some embodiments, each eyepoint may be determined separately, or a single eyepoint may be determined and an offset may be used to determine the other eyepoint.

The relationship among the position/orientation of the display(s) 150 and the eye(s) position of the user may be used to map a portion of the virtual space to the physical space of the system 100. In essence, the physical space and components used are to be mapped to the virtual model in order to accurately render a 3D scene of the virtual space. Examples for implementing such a system are described in the incorporated-by-reference U.S. patent application Ser. No. 11/098,681 entitled "Horizontal Perspective Display" (U.S. Patent Publication No. US 2005/0219694).

One or more of the user input devices (e.g., the keyboard 120, the mouse 125, the stylus 130, etc.) may be used to interact with the presented 3D scene. For example, the user input device 130 (shown as a stylus) or simply the user's hands may be used to interact with virtual objects of the 3D scene (via the viewed projected objects). However, this "direct" interaction may lend itself more easily to the "open space" portions of the 3D scene. Thus, at least a portion of the 3D scene may be presented in this "open space", which is in front of or otherwise outside of (e.g., behind) the at least one display. Thus, at least a portion of the 3D scene may appear as a hologram above the surface of the display 150. For example, when the horizontal display 150B is used, the 3D scene may be seen as hovering above the horizontal display. It should be noted however, that a portion of the 3D scene may also be presented as appearing below the display surface, which is not in "open space". Thus, "open space" refers to a space which the user is able to freely move and interact with (e.g., where the user is able to place his hands in the space) rather than a space the user cannot freely move and interact with (e.g., where the user is not able to place his hands in the space, such as below the display surface). Note that it is possible to have open space behind the display surface, e.g., where the user is able to put his hands behind the display surface and freely move around. Such embodiments may be particularly applicable for see-through displays. This "open space" may be referred to as a "hands-on volume" as opposed to an "inner volume" or "inner space", which may be under the surface of the display(s). Thus, the user can interact with virtual objects in the open space because they are proximate to the user's own physical space. The inner volume is located behind the viewing surface and presented objects appear inside the physically viewing device. Thus, objects of the 3D scene presented within the inner volume do not share the same physical space with the user and the objects therefore cannot be directly, physically manipulated by hands or hand-held tools. That is, they may be manipulated indirectly, e.g., via a computer mouse or a joystick.

In some embodiments, this open space interaction may be achieved by having a 1:1 correspondence between the virtual objects (e.g., in the virtual space) and projected objects (e.g., in the physical space). Thus, an accurate and tangible physical interaction is provided by allowing a user to touch and manipulate projected objects with his hands or hand held tools, such as the stylus 130. This 1:1 correspondence of the virtual elements and their physical real-world equivalents is described in more detail in U.S. Patent Publication No. 2005/0264858, which was incorporated by reference in its entirety above. This 1:1 correspondence is a new computing concept that may allow the user to directly access and interact with projected objects of the 3D scene. This new concept requires the creation of a common physical reference plane, as well as the formula for deriving its unique x, y, z spatial coordinates, thereby correlating the physical coordinate environment to the virtual coordinate environment. Additionally, the 1:1 correspondence allows the user's movement of virtual objects or other interaction (e.g., via the stylus 130) to be the same in physical space and in presented space. However, other embodiments are envisioned where there is a ratio between the distance of the user's physical movement and the corresponding movement in the presented 3D scene (e.g., of the presented object or virtual stylus).

As described below, the user may be able to interact with the 3D scene using various user interface (UI) elements, which may be displayed within the 3D scene.

The 3D scene generator stored and executed in the chassis 110 may be configured to dynamically change the displayed images provided by the display(s) 150. More particularly, the 3D scene generator may update the displayed 3D scene based on changes in the user's eyepoint, manipulations via the user input devices, etc. Such changes may be performed dynamically, at run-time. The 3D scene generator may also keep track of peripheral devices (e.g., the stylus 130 or the glasses 140) to ensure synchronization between the peripheral device and the displayed image. The system can further include a calibration unit to ensure the proper mapping of the peripheral device to the display images and proper mapping between the projected images and the virtual images stored in the memory of the chassis 110.

In further embodiments, the system 100 (e.g., the display(s) 150) can further comprise an image enlargement/reduction input device, an image rotation input device, and/or an image movement device to allow the viewer to adjust the view of the projection images.

Thus, the system 100 may present a 3D scene which the user can interact with (e.g., using UI elements or tools) in real time. The system may comprise real time electronic display(s) 150 that can present or convey perspective images in the open space and a peripheral device, such as stylus 130, which may allow the user to interact with the 3D scene with hand controlled or hand-held tools. The system 100 may also include means to manipulate the displayed image such as magnification, zoom, rotation, movement, and even display a new image.

Further, while the system 100 is shown as including horizontal display 150B since it simulates the user's visual experience with the horizontal ground, any viewing surface could offer similar 3D illusion experience. For example, the 3D scene can appear to be hanging from a ceiling by projecting the horizontal perspective images onto a ceiling surface, or appear to be floating from a wall by projecting horizontal perspective images onto a vertical wall surface. Moreover, any variation in display orientation and perspective (or any other configuration of the system 100) are contemplated.

FIG. 2 illustrates another embodiment of the system 100, shown as 200A and 200B. In this embodiment, the system may be a foldable and/or portable system (e.g., similar to a laptop or tablet computer) where the user may have the system 200 open (as shown in 200A) or closed (as shown in 200B). In this embodiment, the horizontal display and vertical display may be blended by a blending display. Thus, the display of the system 200 may be thought of as a plurality of combined displays, or a single display which is able to project horizontally and/or vertically, as desired.

Exemplary Systems

Embodiments of the present invention may augment the current state of real-time computer-generated 3D computer graphics and tactile computer-human interfaces with real time interaction. More specifically, these new embodiments may enable real-time computer-generated 3D simulations to coexist in physical space and time with the user interacting with the projected objects. This unique ability may be useful in many industries including, but not limited to, electronics, computers, biometrics, medical, education, games, movies, science, legal, financial, communication, law enforcement, national security, military, print media, television, advertising, trade show, data visualization, computer-generated reality, animation, CAD/CAE/CAM, productivity software, operating systems, and more.

Figure 3A:
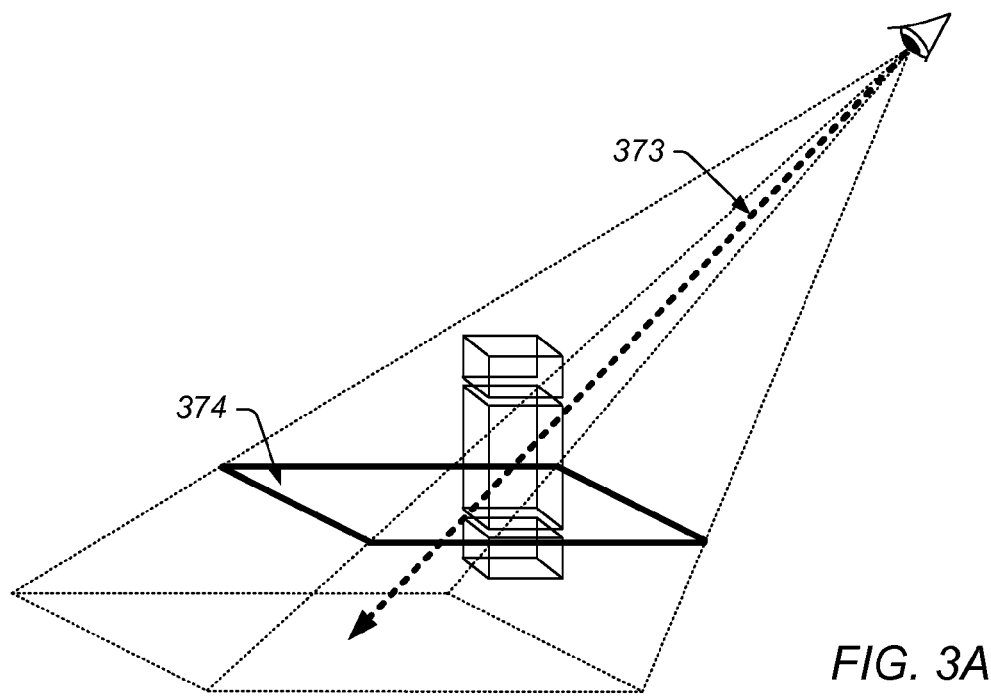
FIGS. 3A and 3B illustrate exemplary horizontal and vertical perspective projections, according to some embodiments.
Figure 3B:
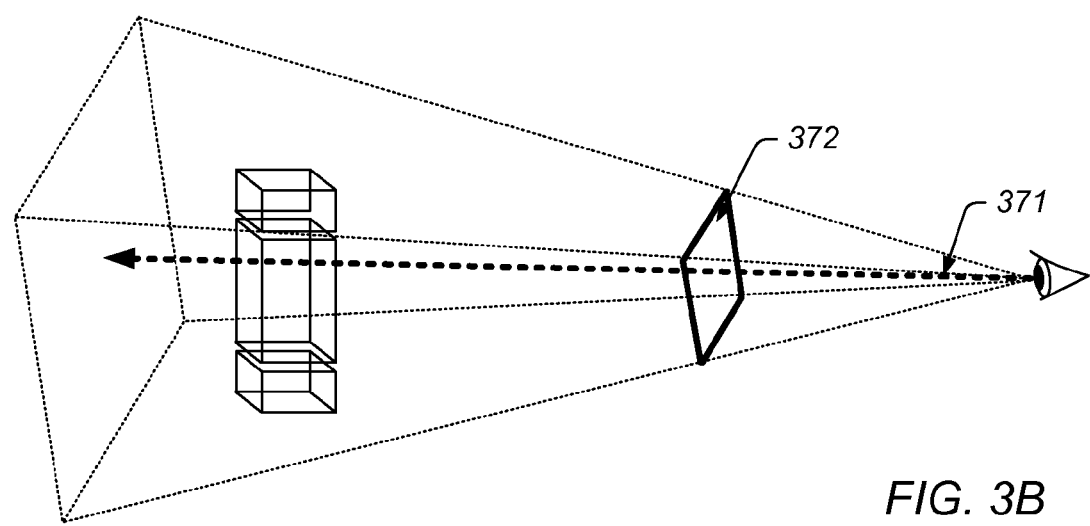

FIGS. 3A and 3B—Horizontal and Vertical Perspective

FIG. 3A illustrates an exemplary diagram of a horizontal perspective projection and FIG. 3B illustrates an exemplary diagram of a vertical perspective projection.

In the horizontal perspective of FIG. 3A, the projected image is not on the plane of vision—instead, it is on a plane angled to the plane of vision. Typically, the image would be on the ground level surface. This means the image will be physically in the third dimension relative to the plane of vision. As indicated above, it may be desirable or important that the image is viewed from the correct eyepoint, otherwise the 3D scene may not represent a physical truism.

In FIG. 3A, the object was drawn by the artist closing one eye, and viewing along a line of sight 373 45° to the horizontal display plane 374. The resulting image, when viewed horizontally at the eyepoint, (in this case, for a single image at 45° and through one eye) looks the same as the original image. In FIG. 3B, the object in the 3D scene (three blocks stacked slightly above each other) was drawn by the artist closing one eye, and viewing along a line of sight 371 perpendicular to the vertical display plane 372. The resulting image, when viewed vertically, straight on, and through one eye, looks the same as the original image.

As can be seen, one major difference between vertical (e.g., central) perspective shown in FIG. 3B and horizontal perspective in FIG. 3A is the location of the display plane (374 and 372) with respect to the projected 3D image. In the horizontal perspective of FIG. 3A, the display plane can be adjusted up and down, and therefore the projected image can be conveyed in the open air above the display plane, e.g., a user can touch (or more likely pass through) the illusion, or it can be displayed under the display plane, e.g., a user cannot touch the illusion because the display plane physically blocks the hand. This is the nature of horizontal perspective, and as long as the rendering viewpoint and the user's eyepoint are at the same place, the illusion is present. In contrast, for the single eye vertical (e.g., central) perspective of FIG. 3B, the 3D illusion is likely to be only inside the display plane, meaning one cannot touch it. However, using stereoscopic images, both perspectives can convey the 3D scene in "open space".

Figure 4A:
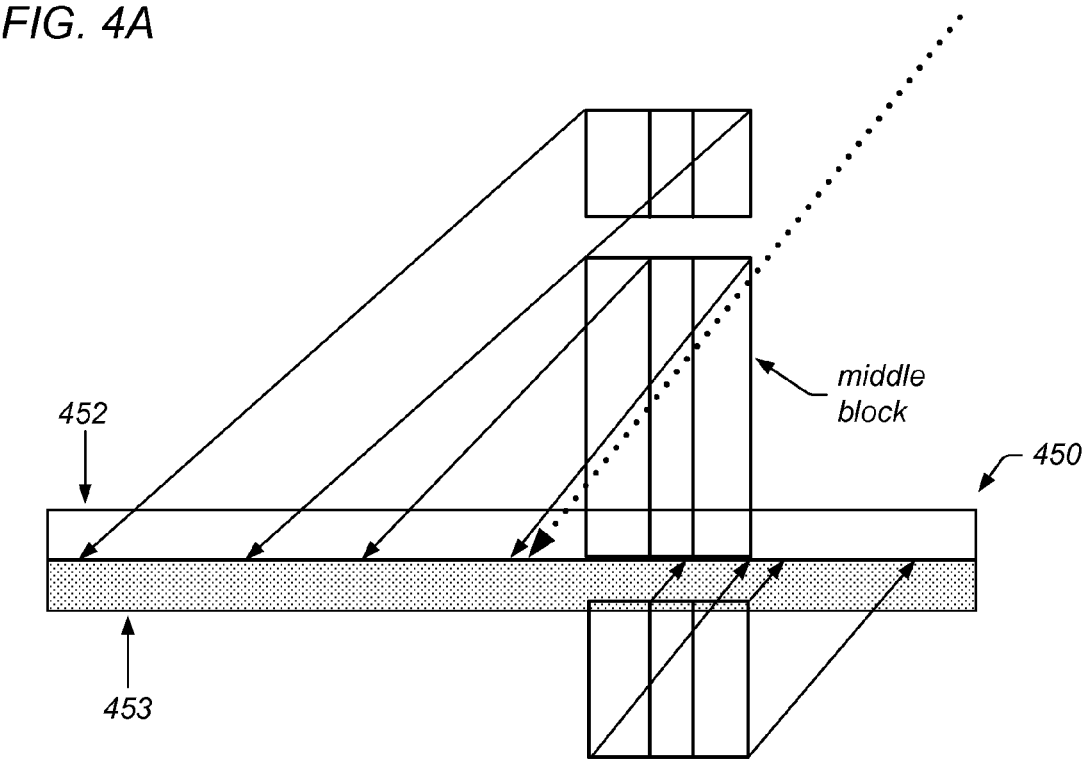
FIGS. 4A and 4B illustrate an exemplary horizontal display with a corresponding horizontal projection, according to some embodiments.
Figure 4B:
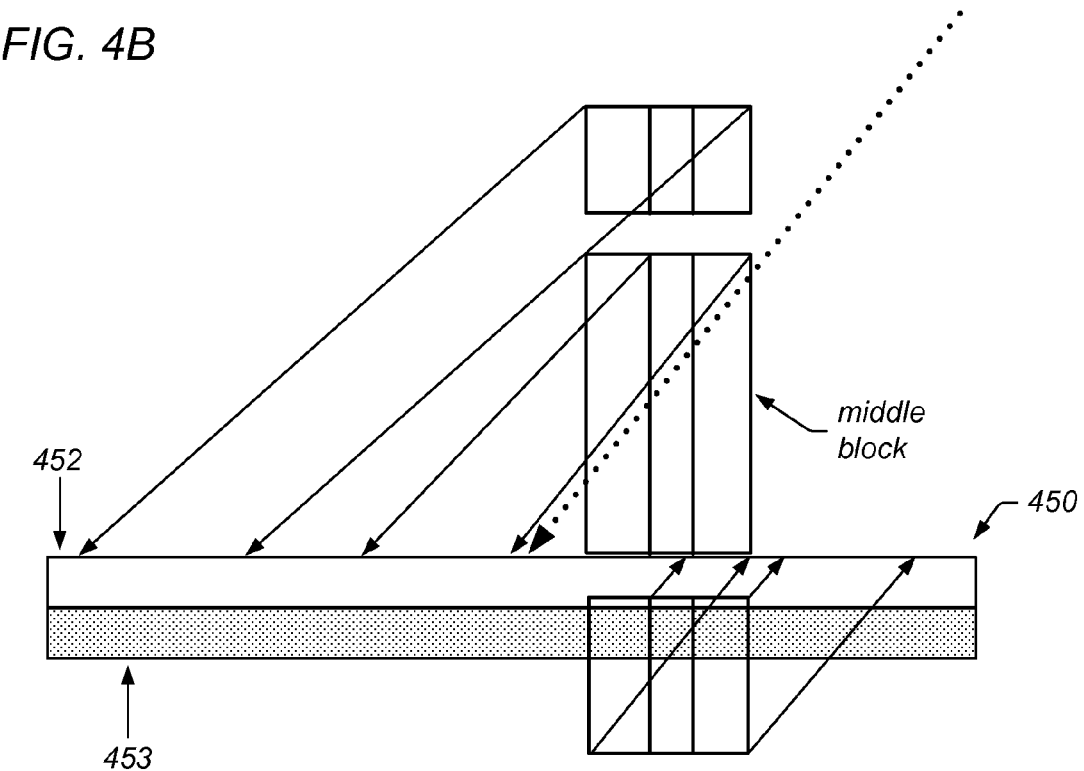

FIGS. 4A and 4B—Display Adjustment for Horizontal Perspective

The display(s) 150 illustrated in FIG. 1 may be made of many physical layers, individually and together having thickness or depth. To illustrate this, FIGS. 4A and 4B illustrate a conceptual side-view of a typical LCD display 450 (an embodiment of one or more of the display(s) 150 illustrated in FIG. 1). FIGS. 4A and 4B also illustrate how the projected 3D scene can include a portion in open space and another portion in the inner volume.

The top layer of the display 450 is the physical "view surface" 452, and the imaging layer (liquid crystal layer), where images are made, is the physical "image layer" 453. The view surface 452 and the image layer 453 are separate physical layers located at different depths or z coordinates along the viewing device's z axis. To display an image, the LCD's polarized light is provided from the image layer 453 through the view surface 452 (which may be glass).

In the example shown in FIGS. 4A and 4B, the same blocks from FIG. 3A and FIG. 3B are shown with a horizontal perspective. As shown, the middle block in FIG. 4A does not correctly appear on the view surface 452. In FIG. 4A, the imaging layer, i.e. where the image is made, is located behind the view surface 452. Therefore, the bottom of the middle block is incorrectly positioned behind or underneath the view surface 452.

FIG. 4B illustrates an example of the proper location of the three blocks on the display 450. That is, the bottom of the middle block is displayed correctly on the view surface 452 and not on the image layer 453. To make this adjustment, the z coordinates of the view surface 452 and image layer 453 are used by the 3D scene generator to correctly render the image. Thus, the unique task of correctly rendering an open space image on the view surface 452 versus the image layer 453 may be critical in accurately mapping the 3D scene objects to the physical projected space.

Thus, the display's view surface 452 is the correct physical location to demarcate the division between open space and inner space and hence image rendering must use this view surface thickness as an offset when intending to render scenes where the object is to be fully conveyed in open space. Therefore, the top of the display's view surface 452 is the common physical reference plane. However, only a subset of the view surface 452 can be the reference plane because the entire view surface may be larger than the total image area.

Many viewing devices enable the end user to adjust the size of the image area within the viewing region of the viewing devices by adjusting certain x and y values. However, all three, x, y, z, coordinates are important to determine the location and size of the common physical reference plane. The formula for this is: The image layer 453 is given a z coordinate of 0. The view surface 452 is the distance along the z axis from the image layer 453. The reference plane's z coordinate is equal to the view surface 452, i.e., its distance from the image layer 453. The x and y coordinates, or size of the reference plane, can be determined by displaying.

The concept of the common physical reference plane is not common. Therefore, display manufactures may not supply its coordinates. Thus a "reference plane calibration" procedure may need to be performed to establish the reference plane coordinates for a given display surface. This calibration procedure may provide the user with a number of orchestrated images with which he interacts. The user's response to these images provides feedback to the 3D scene generator such that it can identify the correct size and location of the reference plane. In one embodiment, when the end user is satisfied and completes the procedure the coordinates are saved in the end user's personal profile. With some displays, the distance between the view surface 452 and image layer 453 is quite small. But no matter how small or large the distance, it is critical that all Reference Plane x, y, and z coordinates are determined as close as technically possible within certain tolerance, e.g., optimally less than a quarter inch.

After the mapping of the "computer-generated" horizontal perspective projection display plane to the "physical" reference plane x, y, z coordinates, the two elements are essentially coincident in space; that is, the computer-generated horizontal plane now shares the real-world or physical x, y, z coordinates of the physical reference plane.

Figure 5A:
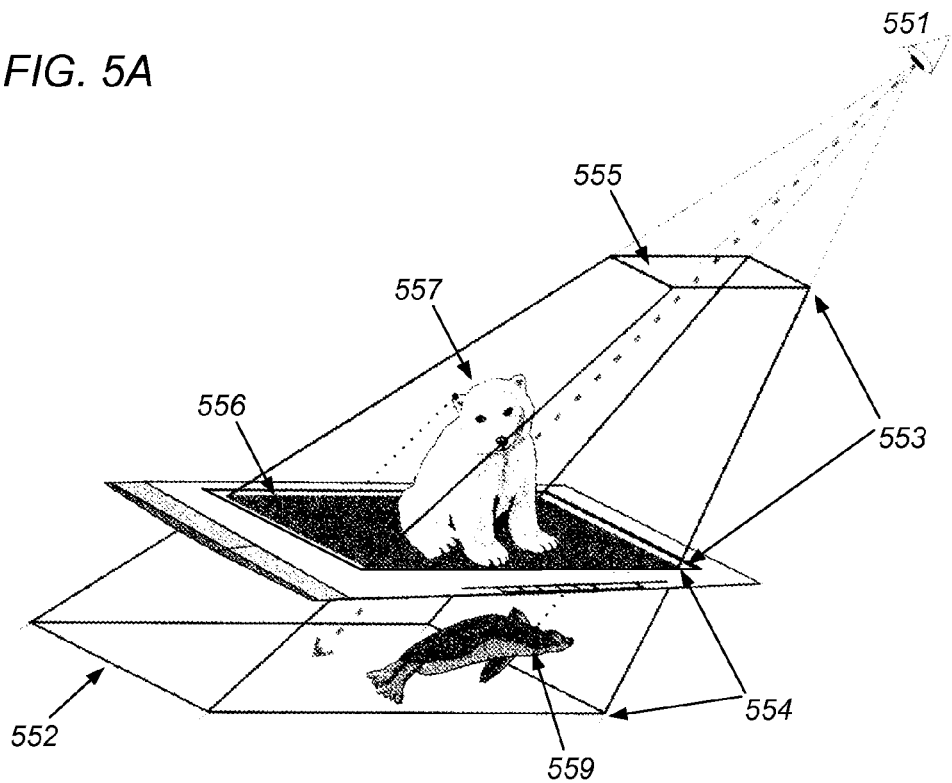
FIGS. 5A and 5B illustrate exemplary view volumes of a horizontal projection, according to some embodiments.
Figure 5B:
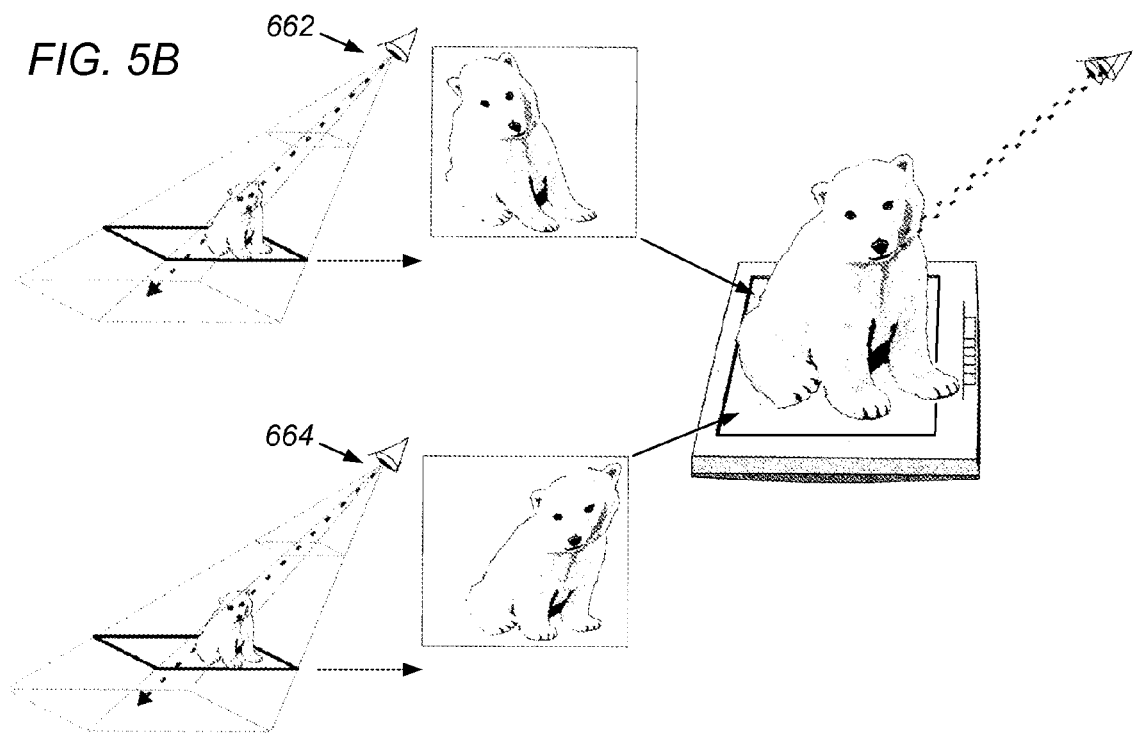

FIGS. 5A and 5B—Exemplary Mono and Stereo View Volumes in Horizontal Perspective FIGS. 3A and 3B illustrate "view volumes" of the horizontal and vertical perspectives, respectively, for a single eye. FIG. 5A illustrates a more detailed single eye view volume in a horizontal perspective, and FIG. 5B illustrates the view volumes of a stereoscopic image.

Mathematically, the computer-generated x, y, z coordinates of the viewpoint (e.g., corresponding to a user's eyepoint) form the vertex of an infinite pyramid, whose sides pass through the x, y, z coordinates of the reference/horizontal plane. FIG. 5A illustrates this infinite pyramid, which begins at the viewpoint 551 and extends through the far clip plane (not shown). There are new planes within the pyramid that run parallel to the reference/horizontal plane 556, which, together with the sides of the pyramid, define two new volumes. These unique volumes are called open space volume 553 and the inner volume 554, which were described previously. As shown, the open space volume 553 may exist within the pyramid between and inclusive of the comfort plane 555 and the reference/horizontal plane 556. As indicated above, in one embodiment, a user may interact with 3D objects located within the inner volume 554 via a computer mouse, joystick, or other similar computer peripheral. The plane 556 along with the bottom plane 552, are two of the planes within the pyramid that define the inner volume 554. Note that while the bottom plane 552 is farthest away from the viewpoint 551, it is not to be mistaken for the far clip plane.

FIG. 5A also illustrates a plane 555, called the comfort plane. The comfort plane 555 is one of six planes that define the open space volume 553, and of these planes it is closest to the viewpoint 551 and parallel to the reference plane 556. The comfort plane (or near plane) 555 is appropriately named because its location within the pyramid determines the user's personal comfort, e.g., how his eyes, head, body, etc. are situated while viewing and interacting with simulations. The user can adjust the location of the comfort plane 555 based on his personal visual comfort through a "comfort plane adjustment" procedure, where the user can adjust the position or closeness of the plane 555. This procedure may provide the user with various 3D scenes within the open space volume 553 and may enable him to adjust the location of the comfort plane 555 within the pyramid relative to the reference plane 556. When the user is satisfied and completes the procedure, the location of the comfort plane 555 may be saved in the user's personal profiles. Other planes, such as the bottom plane may be adjusted similarly.

FIG. 5B illustrates the provision of a stereoscopic image to two single viewpoints (corresponding to two eyes) viewing the 3D scene of the polar bear. As shown, viewpoint 662 may correspond to a user's right eyepoint and viewpoint 664 may correspond to a user's left eyepoint. By rendering and presenting a stereoscopic image according to these single viewpoints, a 3D scene of the polar bear may be provided to the user, e.g., using the glasses 140 as described above.

Figure 6:
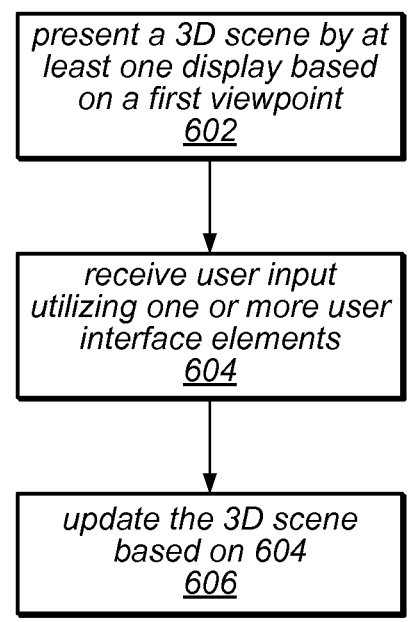
FIG. 6 is a flowchart diagram illustrating one embodiment of a method for utilizing user interface elements for a 3D scene.

FIG. 6—Utilizing User Interface Elements within a 3D Scene

FIG. 6 illustrates a method for utilizing user interface elements within a 3D scene. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, a 3D scene may be presented by at least one display (e.g., the display(s) 150). More particularly, one or more stereoscopic images of the 3D scene may be presented by the display(s). The 3D scene may be presented according to a first viewpoint. For example, the first viewpoint may be based on an eyepoint of a user viewing the 3D scene. In one embodiment, the method may include determining the first viewpoint, e.g., by determining the eyepoint of the user viewing the 3D scene. The method may determine the eyepoint of the user using various techniques, such as a position input device (e.g., glasses which provide eyepoint position information), triangulation, head/eye tracking, etc. Accordingly, the 3D scene may be rendered such that the user can view the 3D scene with appropriately modified projection skewing (e.g., since it is based on the eyepoint of the user). More specifically, when the 3D scene is based on the user's eyepoint, the 3D scene is rendered based on the perspective as would be seen by the viewer. This rendering avoids much of the perceived skewing that would be conveyed if the viewpoint of the scene did not match the eyepoint of the viewer. In other words, a displayed object retains the correct perspective as perceived by the viewer as long as the viewer eyepoint and 3D scene viewpoint remain in correspondence.

As indicated above, the 3D scene may be presented by a single display or a plurality of displays. In one embodiment, the 3D scene may be presented by a vertical display and a horizontal display. For example, the vertical display may present a first stereoscopic image, e.g., according to a vertical perspective, and the horizontal display may present a second stereoscopic image, e.g., according to a horizontal perspective. These two stereoscopic images may form or convey the 3D scene to the user. In further embodiments, the two displays may be joined by a curvilinear or blending display, which may also present a stereoscopic image. The stereoscopic image of the blending display may operate to blend the stereoscopic images of the vertical and horizontal displays. Other numbers and types of displays are contemplated for presenting the 3D scene.

At least a portion of the 3D scene may be presented in "open space" in front of or otherwise outside of the at least one display. Thus, at least a portion of the 3D scene may appear as a hologram above the display surface. For example, when a horizontal display is used, the 3D scene may be seen as hovering above the horizontal display. It should be noted however, that a portion of the 3D scene may also be presented as appearing behind the display surface, which is not in "open space". Thus, "open space" refers to a space in which the user is able to freely move and interact (e.g., where the user is able to place his hands in the space) rather than a space in which the user cannot freely move nor interact (e.g., where the user is not able to place his hands in the space, such as below the display surface). This "open space" may be referred to as a "hands-on volume" as opposed to an "inner-volume", which may be under the surface of the display(s). Thus, the user can directly interact with objects (displayed virtual objects) in the open space because they co-inhabit the physical space proximate to the user. The inner volume is located behind the viewing surface, and portions of the 3D scene within this inner volume appear "inside" the physical viewing device. Thus, objects of the 3D scene presented within the inner volume do not share the same physical space with the user, and the objects therefore cannot be directly, physically manipulated by hands or hand-held tools. That is, objects displayed within the inner volume may be manipulated indirectly, e.g., via a computer mouse, stylus, or a joystick.

In one particular embodiment, the 3D scene may be provided by a display system which conveys two distinct images, where one image is conveyed to be seen by a left eye of a user and a second image is conveyed to be seen by a right eye. The display may be in one of many pitch, yaw, or roll orientations and may have a defined 0 parallax position. For example, two images of a stereo image pair may have a common appearance object feature in the same overlapping location on the screen, hence each eye sees the same object feature at the same location on the screen. Object features that are off parallax may be considered object features that have a common appearance (though the appearance may be slightly different for each eye view), but are slightly different locations on the screen as seen by each eye. Depending upon the perspective and the orientation of the screen to the viewer, the distinct projection and the distinct placement of the object feature on the screen as seen by each eye may be different.

In 604, user input may be received to one or more user interface elements, e.g., presented within the 3D scene. The user input may be received via a user interface device, e.g., whose 3D position is controlled by the user. For example, the user may interact via a stylus, glove, or even using his fingers with an appropriate detection mechanism. Further, the user may interact with a keyboard or other non-direct interaction user input device. The user interface elements may be any of the elements described herein. Particular user interface elements are described in more detail below.

In some embodiments, various ones of the user interface elements may also depend on or use the position of viewpoints or head tracking. Accordingly, the method may involve tracking the viewpoint or head of one or more users and presenting the user interface elements accordingly. For example, in one embodiment, the head tracking may identify where in relation to the display the head is positioned (e.g., in at least three of pitch, yaw, and roll, plus X, Y, and Z).

In 606, the 3D scene may be updated based on the user input to the user interface elements received in 604. More details regarding the changes are provided in the sections below. In updating the 3D scene, the method may add or remove images within the 3D scene, but may still present the updated 3D scene in the manner described in 602 (e.g., via stereoscopic images).

Additionally, the 3D scene may be updated based on changes of the first viewpoint (e.g., corresponding to changes of the eyepoint of a user). For example, the user may move his head, thereby changing the eyepoint location. Accordingly, a next viewpoint (which corresponds to the user's new eyepoint) may be determined after displaying the 3D scene. Based on this next viewpoint, the 3D scene may be updated and an updated stereoscopic image of the 3D scene may be provided by the display(s). Presenting the 3D scene according to the first viewpoint and updating according to a new viewpoint may be performed in the manner described in U.S. patent application Ser. No. 13/019,384, which was incorporated by reference in its entirety above.

FIGS. 7-28F: Exemplary User Interface Elements

FIGS. 7-28F illustrate various embodiments of user interface elements or tools that may be used in interacting with a 3D scene. User interface (UI) elements may be different from typical objects displayed in the 3D scene. More particularly, UI elements may be a special type of content object which may be used to interact or modify the presented 3D scene. Note that while the embodiments are shown with respect to a single display 150B, they may be used with any of the described systems above, e.g., the display 150A, both displays 150, and/or via other combinations or devices, e.g., in any number of pitch, yaw, and/or roll configuration with rendering projected commensurate with the orientation and perspective to the viewer.

Figure 7:
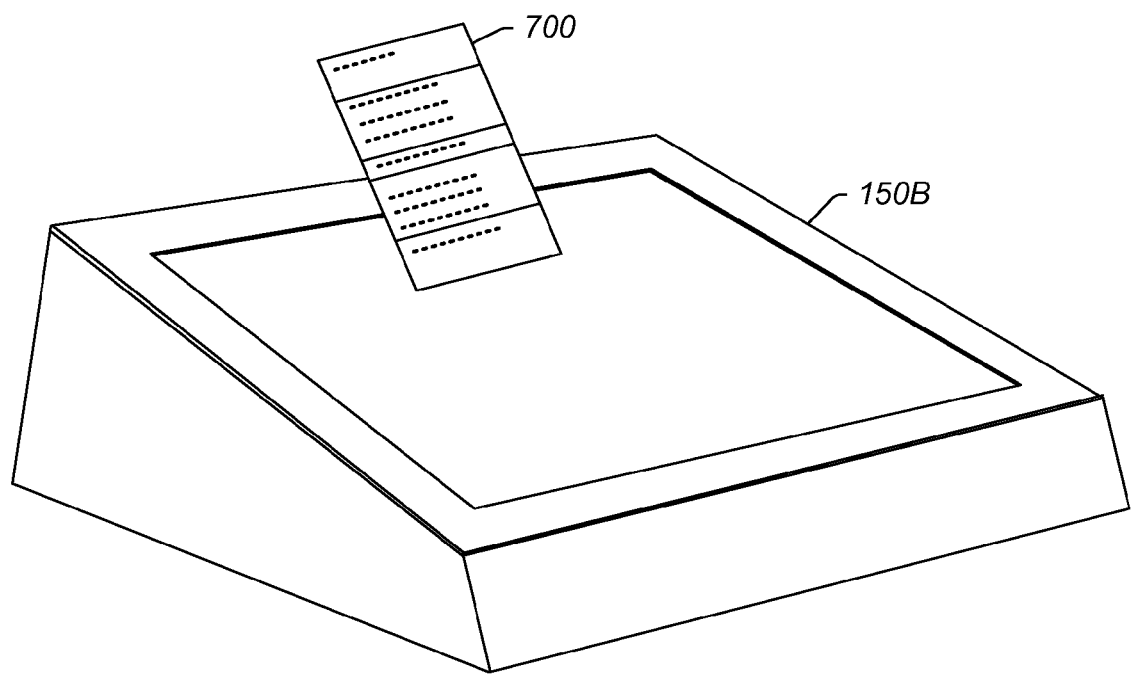

FIG. 7 illustrates one embodiment of a 3D UI element. As shown, the interface element in FIG. 7 comprises an angled menu 700 (also referred to as an angle menu widget), which may appear above the surface of the display 150B.

As shown in the angled menu, the menu items may appear at a tilt relative to either the vertical (e.g., 90 degrees) or horizontal (e.g., 0 degrees) or with respect to the display surface, as shown. In other words, the menu items will not simply display vertically as in standard two-dimensional display systems, but rather the angled-menu item or widget may be displayed at an angle in the 3D scene, e.g., at an angle relative to the x, y and/or z axes in the 3D scene. In one embodiment, the angle may be different from a 90 degree angle relative to the display surface. For example, the menu may be provided such that it is perpendicular to (and therefore facing) the line of sight of a first viewpoint (e.g., the user's eyepoint). In one embodiment, the user can select the angle of tilt of the angled menu item.

Note that while the menu is described as "presented at an angle", the illusion or perception of the angle is generated by the generation of the stereoscopic image that results in the user perceiving the menu at the desired angle. Accordingly, presenting the menu at an angle, as described herein, relates to how the menu is perceived by the user due to the stereoscopic images being generated.

In one embodiment, the menu may extend from a zero parallax or to a zero parallax. Additionally, or alternatively, the menu items may extend from a plane within the 3D scene. For example, the 3D scene may include a plane that corresponds to a displayed floor or wall and the menu may expand from or to the displayed floor or wall. Almost any type of perceived plane is envisioned, such as a sky plane, horizon, street, floor of a building, top of an object, bottom of an object, etc. In addition, the perceived plane may be perceived as originating behind the screen, on the screen, or in front of the screen.

While the menu items are shown within the menu as text, they may be any combination of text and/or images. In one embodiment, the menu may comprise a plurality of 3D icons. The icons may also have an angle that is based on a viewpoint rather than the angle of the display. Thus, in some embodiments, the menu items may have an angle relative to the viewpoint that is different from the angle of the display relative to the viewpoint and/or different from the angle of the menu relative to the viewpoint.

In further embodiments, the menu items may be stereo and/or mono objects, as desired. Additionally, the menu items may be provided within a graphical framework (e.g., as shown in FIG. 7), or may be free floating. In some embodiment, upon selection of a menu item, submenus may be presented. The submenus may expand out in the direction of the menu expansion (e.g., along the plane of the menu) or may extend in a different direction (e.g., at any other X, Y, Z, pitch, yaw, or roll). In one embodiment, the menu items may be displayed in an curved arc. For example, rather than being presented perpendicularly to the viewpoint, the menu items may arc around a perpendicular menu item, similar to the arc created by a user pivoting an arm with a stylus. Accordingly, by presenting the menu items with an arc that mimics the user's arm, the menu items may be more easily selected. In another embodiment, the menu items may be provided in a circle or sphere around a central point (e.g., in a hub and spoke configuration).

In one embodiment, the menu structure may have some items shown in front of another (e.g., when a submenu is invoked and is presented in front of other menu items). Accordingly, transparency may be applied to the menu items to allow the obstructed menu items to be viewed. Similarly, the system may support the user's ability to "look around" a front menu item to see an obstructed menu item. Accordingly, instead of redisplaying the menu items as perpendicular to the user's viewpoint as the user's head moves, they may be displayed in a manner that allows the user to turn to the side or at a different angle to view an obstructed menu item. However, in other embodiments, the menu items may always be re-rendered in order to present the menus in a desired fashion.

Thus, in these embodiments, the menu items may change their orientation and position to match the user's change in viewpoint.

Additionally, or alternatively, there may be more menu items than is currently presented in the menu 700. Accordingly, the user may be able to scroll through the different menu items. In one embodiment, this may be achieved by using one or more keys of a keyboard (e.g., selecting up and down arrows to scroll through the list), providing input to a touch pad (e.g., providing a gesture, such as a two finger vertical motion to scroll), providing input to a stylus (e.g., providing a flicking gesture or positioning the stylus at a certain angle to scroll through the items), etc. Almost any gesture or method for scrolling may be used.

The menu 700 and menu items may be presented in vertical, horizontal, or some graphic projection (or perspective) in between. In one embodiment, the projection (or perspective) may be independent or dependent on the position of the display. For example, for a horizontal display, the menu items may be presented with horizontal projection conveying objects extending above the display. As a different example, for a vertical display, the menu items may be presented with vertical projecting conveying objects extending in front of the display. For an angle in between, an angled projection may be used. Alternatively, the provided perspective may only depend on the user's viewpoint relative to the display rather than the position of the display, as in the above examples.

Figure 8A:
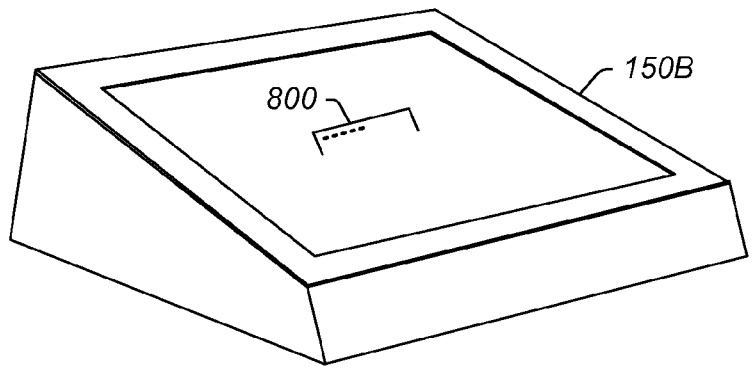
Figure 8B:
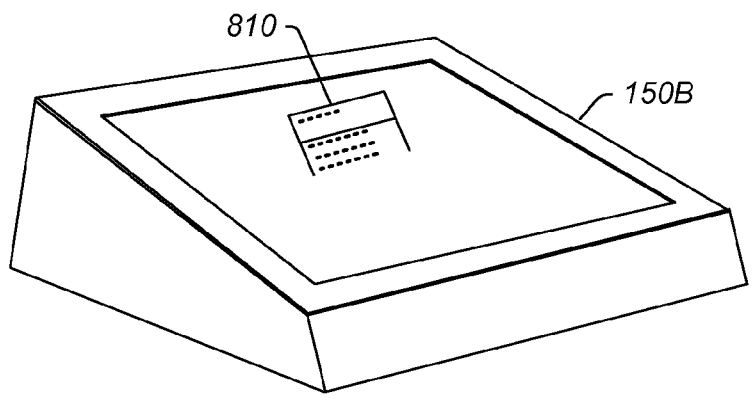
Figure 8C:
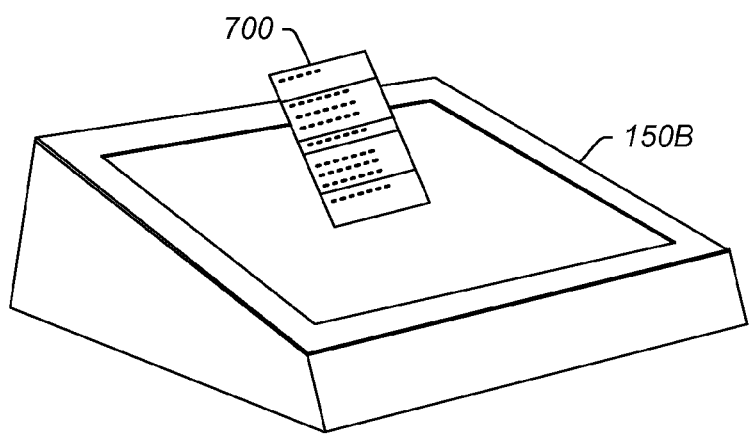

FIGS. 8A-8C illustrate another embodiment of a 3D UI element. In this embodiment, the UI element (which is shown as the angled menu 700) may be configured to "come out" or "rise out" of the surface menu as a pop-up item. In other words, the UI element may initially appear as shown in FIG. 8A, and the window or menu may "pop up" as a 2D or 3D plate from the horizontal, as shown in 8B and 8C. The menu items may be appear in a gradual fashion or one at a time, as desired. When the user-interface element (e.g. the window or menu) pops up or rises up, the UI element may appear at an angle to the user as shown in FIG. 7. The 3D UI element may disappear via various animations, e.g., in the reverse of 8A-8C (which would appear as 8C-8A), instantly, with a "poof" animation, etc.

Figure 9:
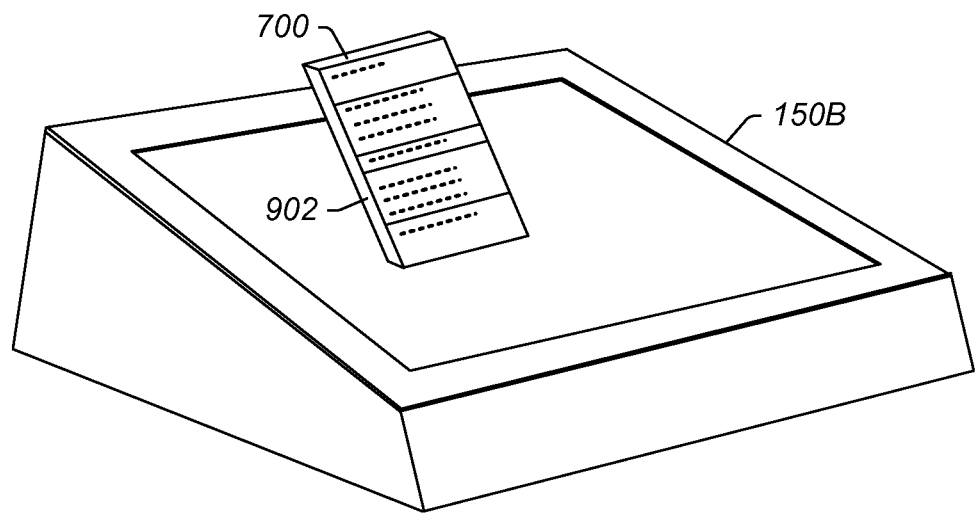

The UI element may have varying angles, thickness, transparency, translucency, reflectivity, and placement (e.g., in order to prevent eye strain). For example, as shown in FIG. 9, the UI element (again shown as menu 700) may have a thickness 902, which may be more pleasing than one that does not have thickness. Thus, FIG. 9 illustrates a 3D UI element that has a depth. More specifically, the menu item 700 is of a 3D nature in that it has height, width, and also a measurable depth. In one embodiment, the menu may have, for example, a cardboard thickness. The thickness of the UI element can vary based on selections (e.g., preferences) by the user. In other words, the thickness of the user interface element is configurable by the user, e.g. through a menu or other type of selection. In one embodiment, the thickness may be proportional to the length and/or width of the menu. For example, the thickness may be 1/10 of the smallest of the menu's length or width. Additionally, the UI element may vary any number of other properties, (e.g. shape, angle, gradient, color, brightness, transparency), as desired. Further, similar descriptions apply to other features of the UI element, such as, for example, a bezel of the menu.

Figure 10:
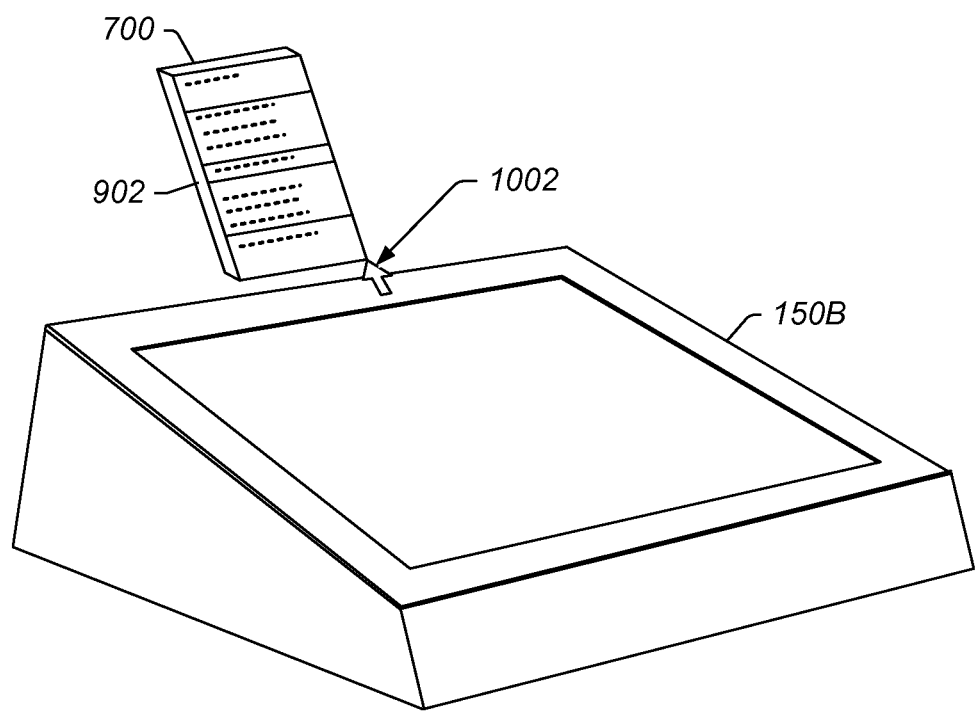

FIG. 10 illustrates a UI element (shown again as menu 700) which may be positioned at a point of focus. In the particular example shown, the UI element may be shown at the point of a cursor (e.g., which may be manipulated via the stylus 130 or another user input device). More specifically, FIG. 10 illustrates operation where a user positions a cursor 1002 within the 3D scene and makes the selection which causes a localized menu or tool selection to appear at the point of the cursor 1002 within the 3D scene. In other words, when a menu is selected, e.g., through a keyboard shortcut or other user input, the 3D menu 700 may appear at the location or point within the 3D scene where the stylus or cursor is currently pointing within the 3D scene. The placement of the UI element may be based on user selection or configuration, prior user selection of various attributes such as an OK button, top dash left, center, etc. In other words, when the user provides input for the user interface element to be displayed at the cursor location, the portion of the menu displayed at the cursor location may correspond to a previously configured part of the UI element such as the OK button.

As indicated above, however, the UI element may be positioned at a point of focus via other mechanisms, e.g., proximity to a selected object, head or eye tracking, which may indicate where the user's focus is in the 3D scene. By placing the UI element at the user's point of -focus- (where the user is looking), eye strain may be reduced since the user's accommodation and convergence of the 3D scene may not have to change to a high degree. If the user is required to change his convergence, especially when it is at a point away from the display surface of the display 150B, then eye strain may develop, which is undesirable. Thus, by providing the UI element at the point of -focus-, instead of a default point or other point, the user may have a more pleasing experience.

Figure 11A:
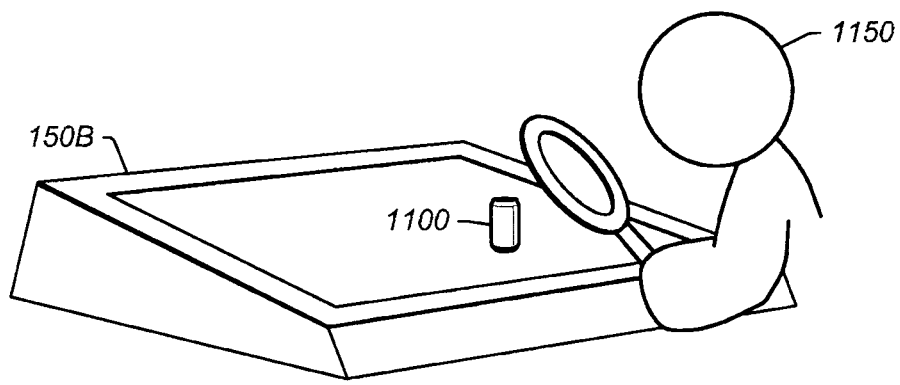
Figure 11B:
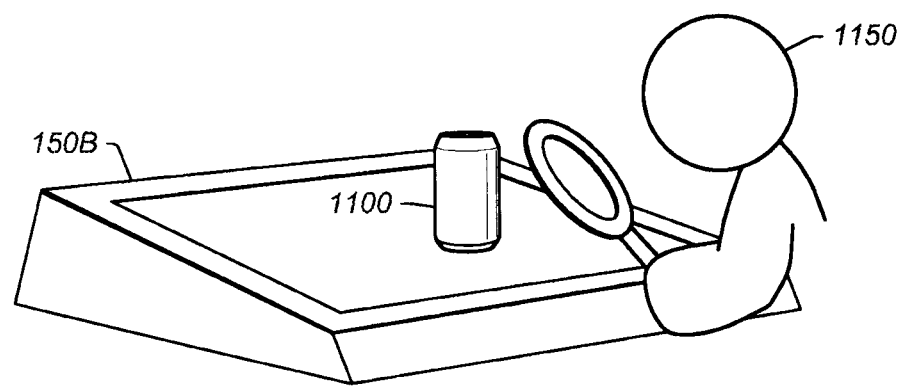

FIGS. 11A and 11B illustrate an embodiment of the invention whereby a user can select an option to switch the scale of the 3D scene. More specifically, FIG. 11A shows a 3D scene where an object, e.g., a soda can 1100, is displayed at an unreal scale. The user 1150 may then provide input to configure the scaling of the 3D scene to change from the unreal scale to a real scale. When this user input is received, the system causes objects within the 3D scene (in this case the soda can 1100) or the entire 3D scene itself to change or shift to the user scale, also referred to as real scale. In one embodiment, the user 1150 can use a stylus to select one or more objects within the 3D scene and then provide input to change the scale to a real scale or different scale. Alternatively, when the user provides input, the entire 3D scene changes scale to the "real scale" or some other preconfigured scale. As shown in FIG. 11B, the soda can 1100 is now scaled to the same size as a real soda can, and thus has been scaled to the user's scale (or real scale).

This effect can be achieved by creating the object with actual physical dimensions (e.g., actual inches or other physical units) which correspond to the physical object and by knowing the display properties of the display 150B (e.g., the DPI). In one embodiment, metadata is stored with the object, wherein this metadata comprise the actual physical dimensions of the object. Utilizing this information, the object may be scaled to its actual physical size, thereby achieving a 1:1 correspondence between projected objects and corresponding physical objects. Scaling the object to its physical size may also be based on the display resolution of each display, angle of view, etc. In a broader sense, this allows objects to have a common scale across multiple displays and projects. Thus, if a user creates an object for a first display in a first project, it will have the same size on a second display in a second project, since the same scale is being used. Thus, in the embodiment of FIGS. 11A and 11B, an object may be arbitrarily scaled, and by providing some user input, one or more objects within the scene (or the whole scene) may be rescaled to the user's (or real) scale.

Figure 12A:
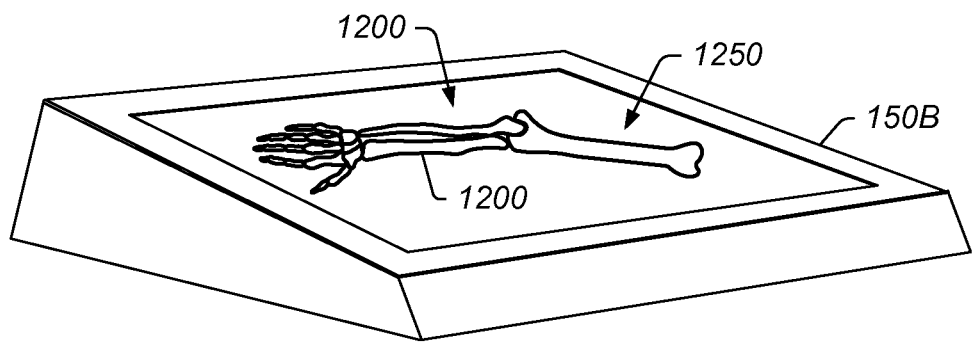
Figure 12B:
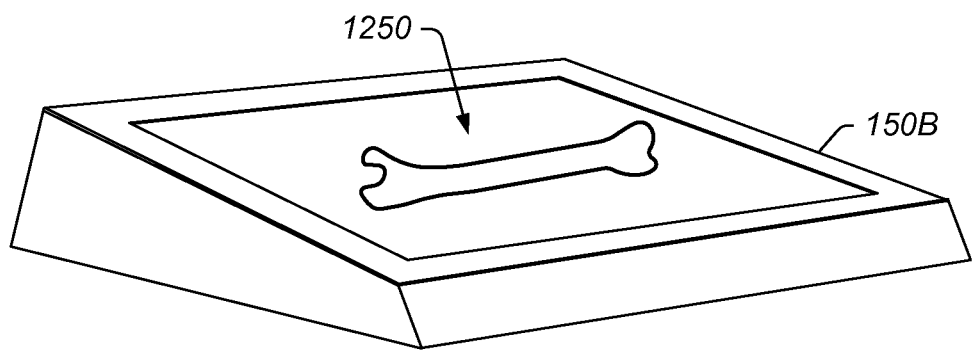

FIGS. 12A and 12B illustrate an exemplary UI element or feature where a user can select a subobject from an object and remove the subobject from its normal place within the object. For example, in the embodiment of FIG. 12A, the user may select a bone 1250 from the arm 1200, e.g., for editing or inspection. Accordingly, in FIG. 12B, the arm 1200 of FIG. 12A may automatically disappear and the bone 1250 may be shown for closer inspection. In this embodiment, when the bone 1250 is selected for editing or inspection, the bone 1250 may automatically move to the user's "comfort region" so that the user does not have to strain or be in an uncomfortable position for extended periods of time in order to interact with the object. For example, the comfort region may be closer to the user (e.g., the front of the display 150B) and may allow the user's hand or arm to rest on a surface (e.g., may be within an inch of the display surface). As another example, if the user wished to draw a tattoo on an arm of a projected avatar, the user may be able to select the arm and have the arm automatically move to the user's comfort zone and also magnify (e.g., to the user's scale) automatically, thereby allowing the user to draw the tattoo on the arm. Upon completion, the subobject may be automatically returned back to its original position and the remaining scene may be automatically returned to its original scale and position. Thus, in the embodiment of FIGS. 12A and 12B, upon release, or via one or more selections, the bone 1250 may be returned back to the arm 1200, and the arm may be displayed as in FIG. 12A.

Note that the above procedure may be implemented using any number of methods. For example, the subobject may be selected by selecting a button (e.g., on the stylus or elsewhere) and may be moved about via user input while the button is depressed. Upon release of the button the object may automatically snap back to its original position. This embodiment may be particularly useful for inspection. In alternate embodiments, the user may select and reposition the subobject manually. However, the user may be able to invoke a special selection (e.g., via a special mode or button) where the selected object automatically moves to his comfort region. Upon completion (e.g., in any of these embodiments), the subobject (and the scene) may be automatically returned to its original location. This embodiment may be particularly useful for editing (e.g., as in the tattoo example above). Note that if the subobject no longer fits, e.g., the fit of the subobject within the object changes due to editing, a notice may be presented and/or the subobject/object may be automatically modified so that they are able to fit together. In alternate embodiments, instead of removing the subobject from the object, the entirety of the object or the scene may be automatically repositioned so that the selected object is in the user's comfort region. Thus, in this embodiment, instead of removing the subobject from the object, the scene (or simply the object and/or surrounding objects) may be automatically repositioned and/or rescaled in the comfort region.

Additionally, the animations and display properties during the procedure above may vary significantly. For example, the arm 1200 may not disappear when inspecting or editing the bone 1250 (as shown in FIG. 12B), but may be automatically made translucent or have some transparency (so that the user is not distracted by its presence). Additionally, while the bone 1250 is shown as being recentered and brought closer to the user (so that the user can more easily inspect or modify the bone 1250), it may simply stay in its original location and the arm 1200 may automatically temporarily disappear (e.g., with an animation) or change transparency during inspection/editing so that only the bone 1250 is emphasized.

Figure 13A:
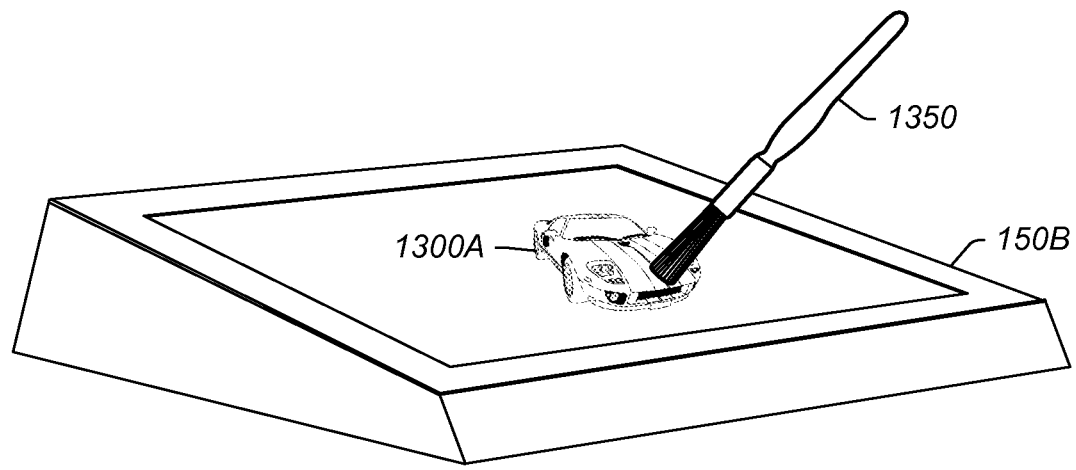
Figure 13B:
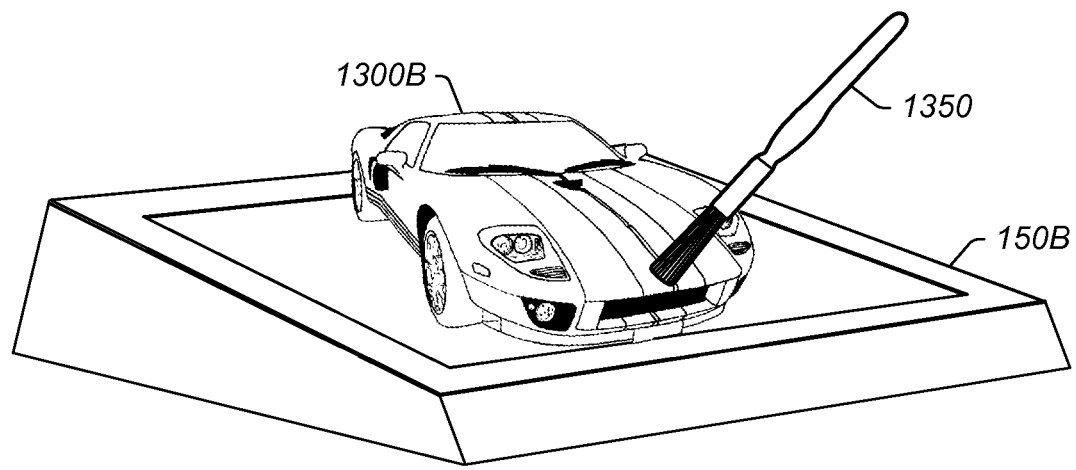

FIGS. 13A and 13B illustrate an embodiment where an object may be repositioned and/or scaled for easier interaction using a tool. For example, in FIG. 13A, the user is using a paint brush tool 1350 to interact with car 1300A. However, the car 1300A is very small compared to the size of the paint brush tool 1350. Accordingly, as shown in FIG. 13B the car 1300A of FIG. 13A may be automatically scaled up to an appropriate size, e.g., car 1300B, for the size of the paint brush tool 1350. In some embodiments, the object may be automatically rescaled and repositioned into a comfort region as indicated above, so that the object is more easily interactable. Additionally, the position of the selection of the object (in this case, the hood of the car 1300A may determine the orientation/position of the car 1300B. For example, where the car 1300A has an initial position that is away from the user, if the user places the paintbrush on a fender of the car 1300A, the car 1300A automatically scales up and may also automatically rotate to present the fender to the user as in 1300B. The original object may be automatically minimized in a region of the view space, as shown in FIG. 13B. Thus, as shown in FIGS. 13A and 13B, when an object is selected to be acted upon (e.g. to be acted upon using a stylus), the object may be automatically positioned and oriented in a region of the view volume that is proximate to tool access and scaled to a size to be appropriately acted upon.

Figure 14A:
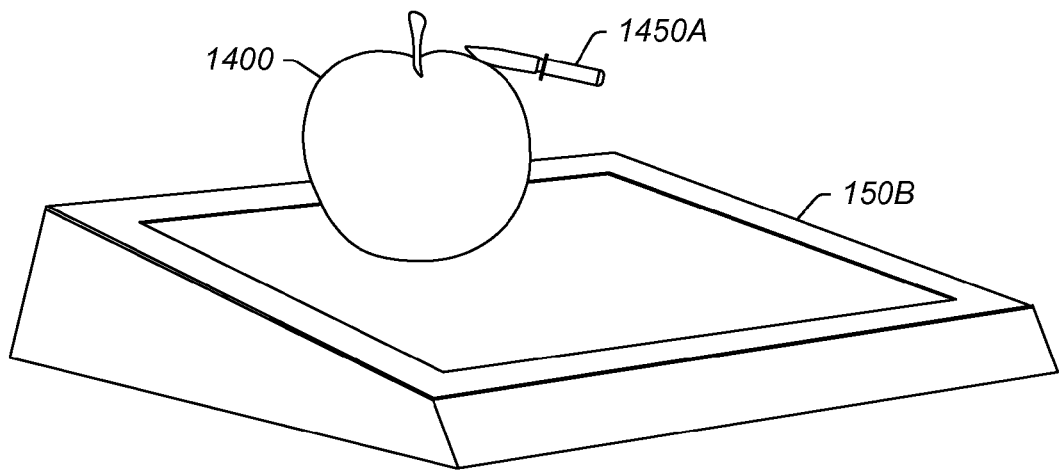
Figure 14B:
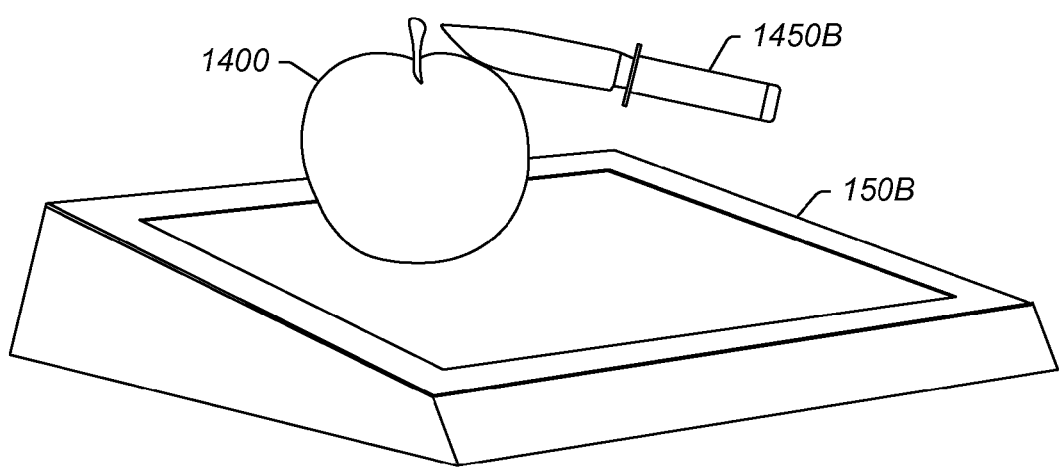

FIGS. 14A and 14B illustrate an embodiment where a tool may be scaled for easier interaction with an object. As shown in FIG. 14A, the user is using a knife tool 1450A to interact (e.g., cut) apple 1400. However, the knife tool 1450A is not appropriately scaled for cutting the apple 1400. Accordingly, in the embodiment of FIG. 14B, the knife tool 1450A may be automatically scaled up to the size of the apple 1400, as 1450B. Thus, in contrast to scaling the object to the tool size of FIGS. 13A and 13B, the tool may be automatically scaled to the size of the object. In some embodiments, only one of these methods may be used, or both, depending on the situation. For example, both the tool and the object may be automatically scaled to a size that is more appropriate for interaction (e.g., where both are small, but it is hard for the user to accurately use the tool on the object). The determination of scaling during tool use may thus be based on the ease of interaction for the user, which may involve scaling the tool, the object, or both. In these embodiments, the user does not have to tediously spend time and effort making the object and/or the tool the proper size, but instead, the system may perform scaling appropriately and automatically. However, the user may be able to further manually adjust either or both of the scales (for the tool and object) to make his own adjustments.

Figure 15A:
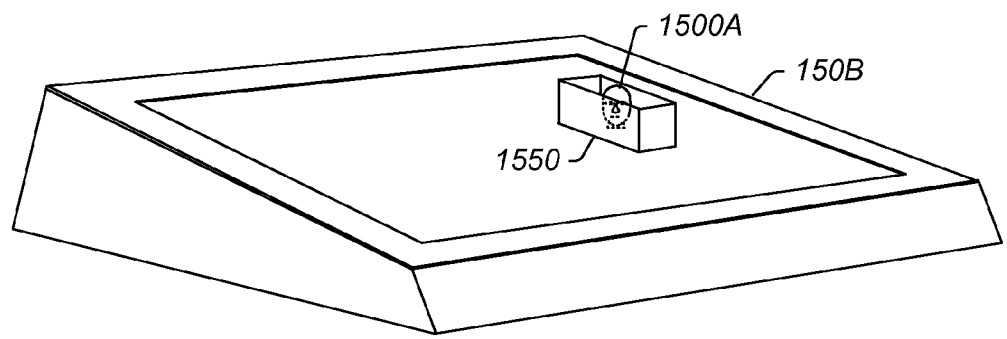
Figure 15B:
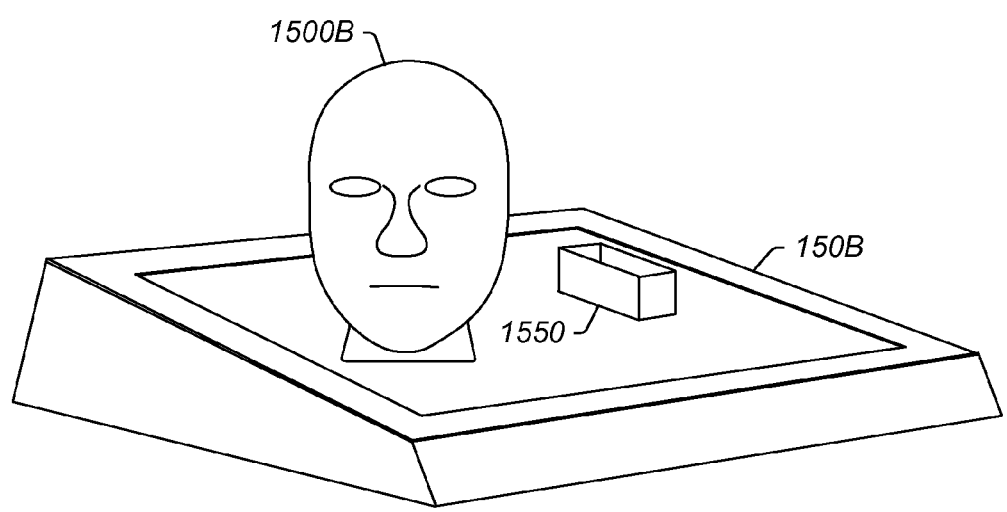

FIGS. 15A and 15B illustrate embodiments where objects may be minimized or changed into icons for selection by the user. More particularly, as shown in FIG. 15A, a minimized version of a head 1500A (which may be 2D or 3D, and may be referred to as an icon) may be present in a container 1550 displayed by the display 150B. When the user selects the head 1500A and provides input to position the head 1500A on the screen, the head 1500A in FIG. 15A may be automatically rescaled (e.g., to the scale of the scene or real scale) and projected as an object within the 3D scene, as shown as head 1500B in FIG. 15B. The transition from the icon to the scaled size may be a gradual change or an immediate one, e.g., as the head 1500A is outside of a threshold distance of the container 1550 or top of the container 1550. Note that the container 1550 may be a projected container, or may simply be a portion of the display 150B (e.g., where there is no visual container, but any object in that portion is iconized or minimized). In some embodiments, this rescaling behavior may occur only with a specific container (such as the container 1550) or any object which can contain objects, as desired.

An object may similarly be automatically minimized by being placed in the container 1550 or in the portion of the display 150B described above. Alternatively, the user may be able to select a minimize option (e.g., via voice activation, a particular button, a gesture, etc.) which may minimize the object without having to manually move the object to the container 1550 or portion of the display 150B. Note that the scaling of an object to tool size as described in FIGS. 13A and 13B may be particularly relevant when the object is initially minimized, as in FIGS. 15A-B.

Figure 16:
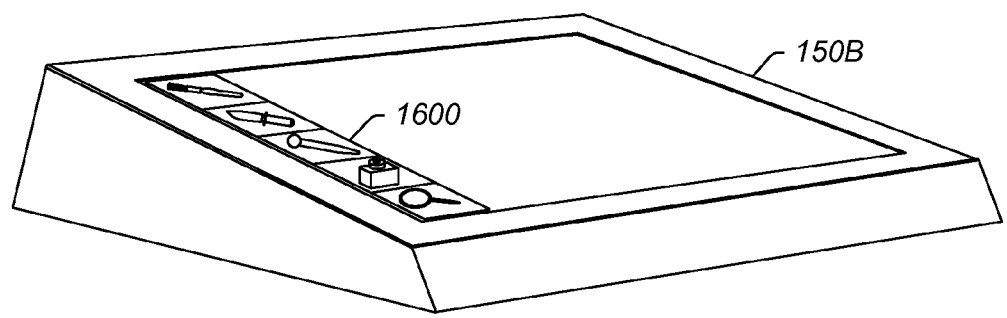

FIG. 16 illustrate a similar concept for tools. In this embodiment, tools may be selected from corresponding portions 1600 (e.g., a palette) of the display 150B. Thus, the user may change the current tool to a different tool by selecting a corresponding tool in the portions 1600. However, similar to FIGS. 15A and 15B, the tools could be placed in a container, e.g., as in 1550, rather than aligned on a portion of the display 150B. Note that the automatic scaling of a tool to an object as described in FIGS. 14A and 14B may be particularly relevant where the tool is initially minimized, as in these Figures.

The portions 1600 may also be relevant for minimizing and/or switching between programs or entire 3D scenes that may be displayed by the display 150B. Further, individual objects can be minimized to this portion of the screen (which may be referred to as a "dock") and may be selected for reappearance in the 3D scene. Thus, a portion of the display 150B may be used for minimizing/maximizing/switching portions of scenes, entire scenes, executing programs, etc., as desired.

Figure 17A:
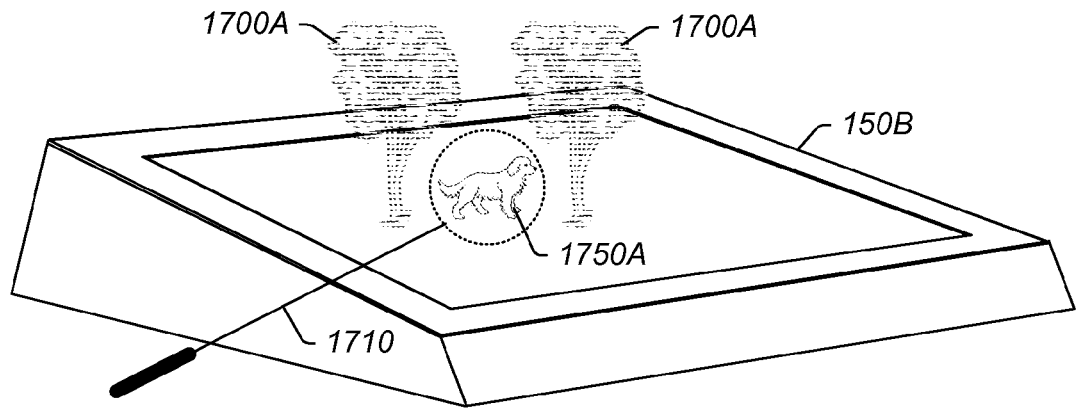
Figure 17B:
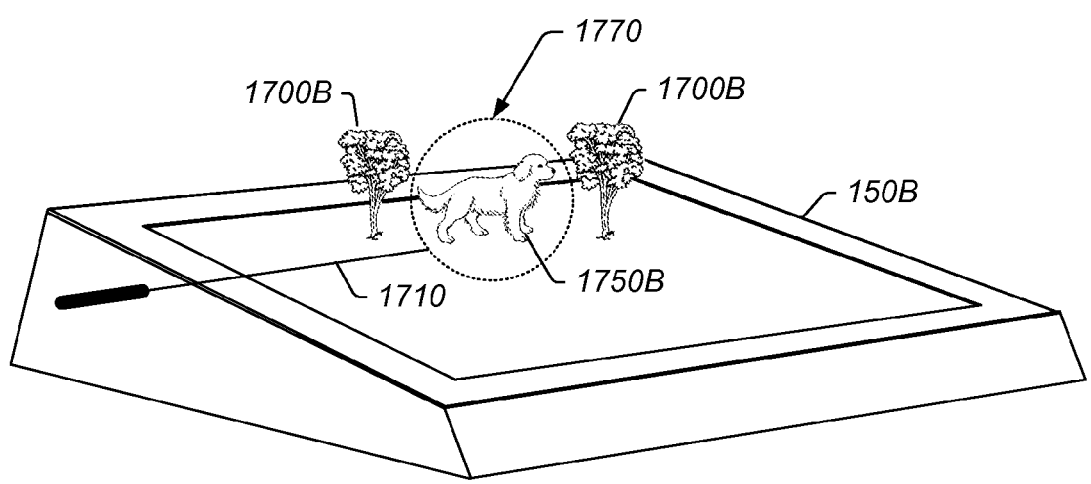

FIGS. 17A and 17B illustrate embodiments of a UI element or feature which may assist a user in selecting small objects. The objects may be small due to scaling or distance (e.g., they may be large when viewed close, but may appear small because they are in the distance). As used herein, a "small" object may refer to any object which is difficult for the user to interact with or otherwise select due to its projected size. It is often difficult for a user to select such objects. Accordingly, a number of techniques can be used to assist the user in this task. In the embodiment shown in FIG. 17A, the user may be attempting to select a dog 1750A among trees 1700A using a laser (also referred to as a "laser beam tool") 1710 (e.g., which may extend from the user's stylus). In one embodiment, in order to assist the user to select the dog 1750A, a region of selection of the dog 1750A may be automatically expanded such that the dog 1750A does not have to be absolutely selected (e.g., by the laser 1710 touching a portion of the dog 1750A). The region of selection of the dog 1750A in FIG. 17A may be automatically expanded (as shown by the expanded dog 1750B in FIG. 17B) in response to the laser 1710 coming within a certain proximity to the dog 1750A within the 3D scene. In this embodiment, the dog 1750B may be more easily selected since regions next to dog 1750B may be scaled down, as shown by trees 1700B as illustrated in FIG. 17B. In further embodiments, the laser 1710 may utilize anti jitter features, such that even if the user's hand is shaking while using the stylus, the laser 1710 may not shake, thereby assisting the user in selecting the dog 1750A. Further, the laser 1710 may automatically enter a slow motion mode, e.g., where movements of the stylus do not have a 1:1 corresponding movement in the laser 1710, e.g., a 1" movement of the stylus may correspond to a 0.5" movement of the laser 1710. In other words, the sensitivity of the cursor or stylus may be automatically decreased when the cursor or stylus comes within a certain proximity to an object within the 3D scene.

In further embodiments, a zoom function may be used to assist the user. Various different types of zoom functions are envisioned, e.g., where the entire scene automatically zooms in on the region to which the laser 1710 is pointing. In the embodiment of FIG. 17B, only objects within a certain radius of the laser 1710 are automatically zoomed in, and surrounding objects are automatically scaled down and visually moved out of the way. As shown in FIG. 17B, the dog 1750A of FIG. 17A is shown larger as dog 1750B and the trees 1700A of FIG. 17A are shown smaller as trees 1700B. The area of zoom is shown to the user via indication 1770.

Various different techniques may be used to invoke this behavior. For example, the user may select a special key to invoke one or more of these techniques. Alternatively, or additionally, the system may automatically invoke the behavior as the user attempts to select (e.g., moves the laser 1710 across) various smaller objects. Thus, various techniques may be used to assist the user in selecting small objects.

Figure 18A:
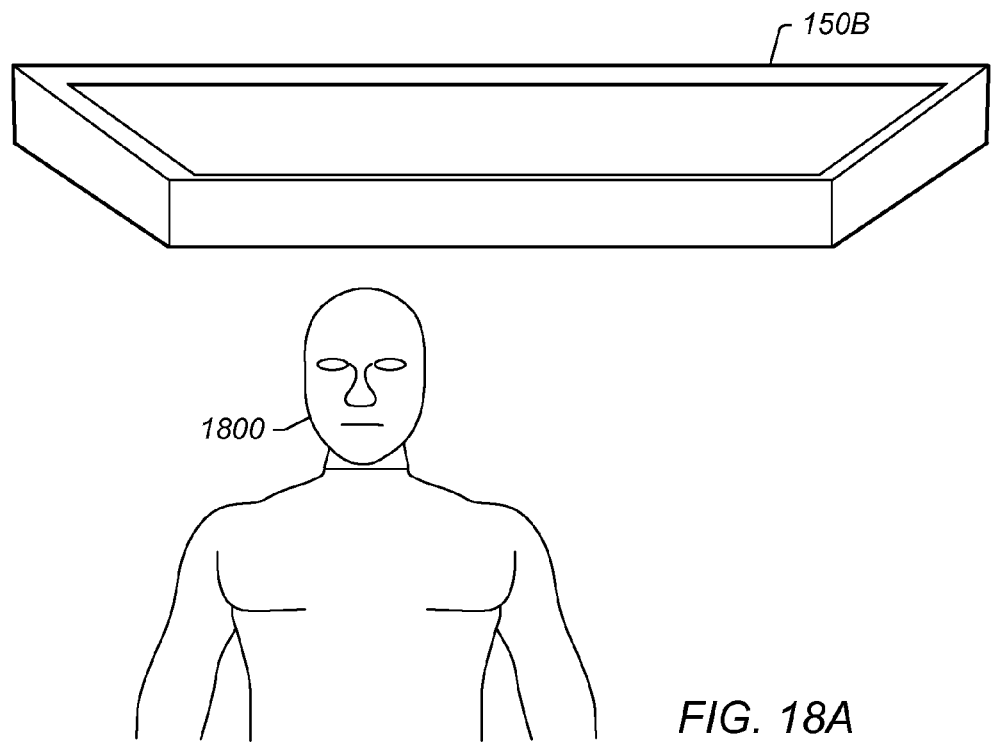
Figure 18B:
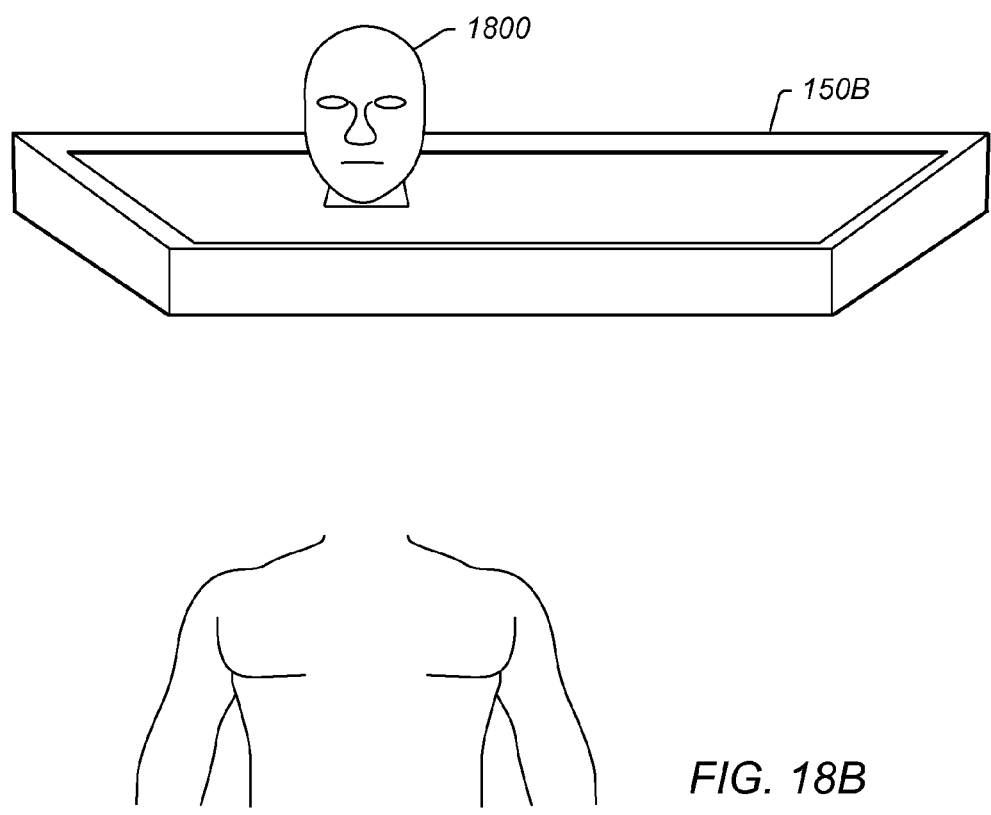

FIGS. 18A and 18B illustrate a UI feature that allows a user to interact with an object or subobject that is currently displayed below the surface of the screen (e.g., in the inner space). In the embodiment shown, the user may select head 1800 and invoke the UI feature (e.g., via various possible actions, should as voice, button selection, gesture, etc.) to move that object into open space, as shown in FIG. 18B. Once in open space, the user may interact with the head 1800 more directly, e.g., with his hands or a stylus. Thus, by moving an object from inner space to open space, the user may more easily interact with the object, e.g., using a stylus. In some embodiments, only the selected subobject may be moved into open space (such as the embodiment shown, where the body does not move with the head 1800). Alternatively, the associated object may also move with the subobject, e.g., where the head would still be positioned as in FIG. 18B, but the body would still be attached. In further embodiments, the entire scene may be correspondingly moved, rather than just the object or the subobject.

Figure 19A:
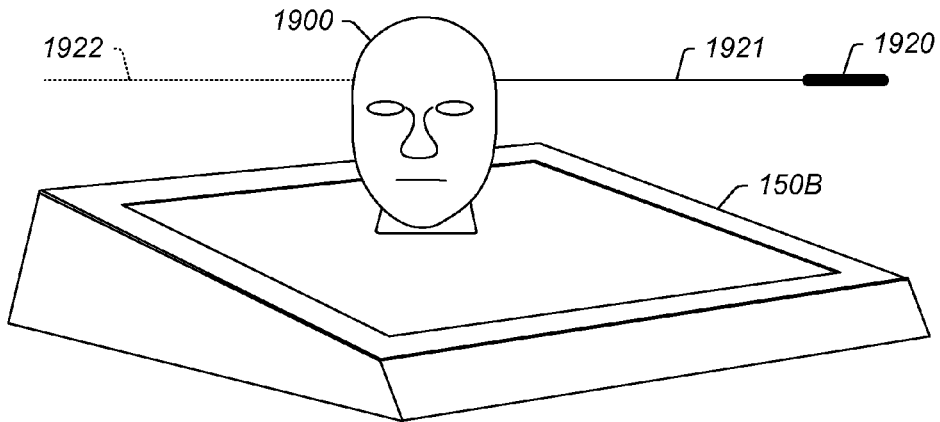
Figure 19B:
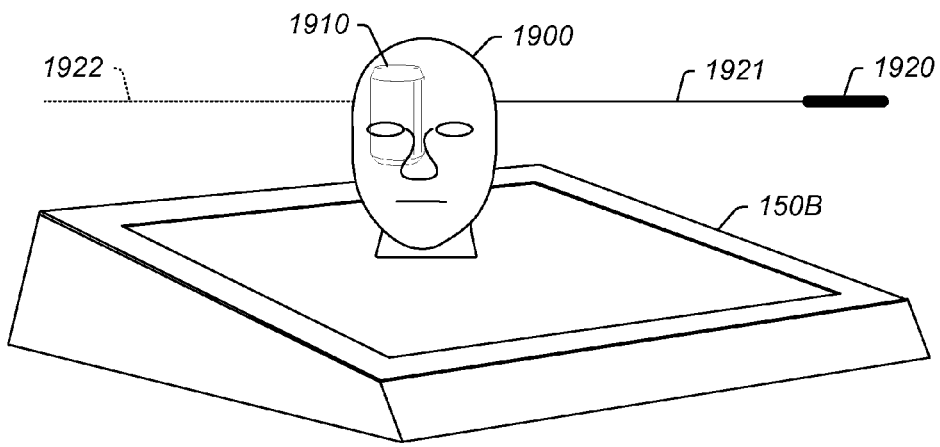
Figure 19C:
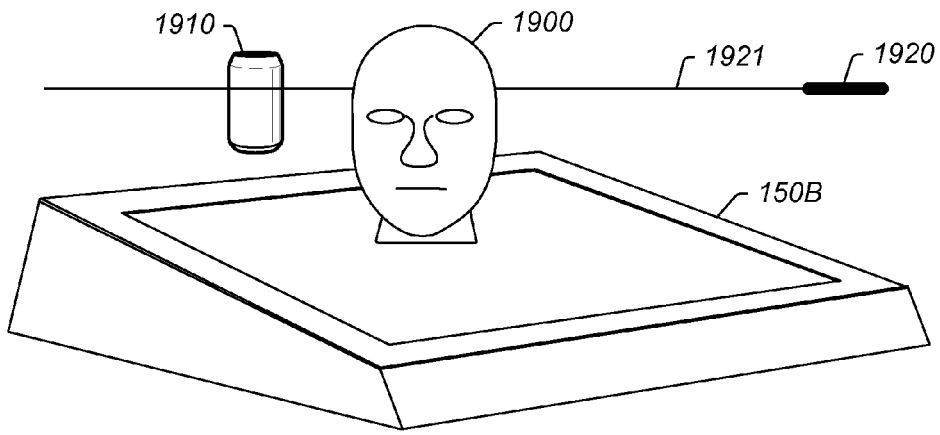

FIGS. 19A-19C illustrate a UI element or feature where a laser 1920 may indicate when there is an invisible or obscured object behind a visible object. More particularly, in FIG. 19A, the user may use a stylus to direct a depicted laser at or through the head 1900. The system may analyze or be aware that, from the user's perspective, there is an invisible or obscured behind the head 1900. Accordingly, the system may automatically visually indicate that there is an obscured or invisible object. This may be performed via any number of ways. In the embodiment of FIG. 19A, the laser 1920 (i.e., the beam of the laser beam tool) may take on two colors 1921 (before the head 1900) and 1922 (after the head 1900), which may indicate that there is an object behind the head 1900 from the user's point of view. Alternatively, such an indication could be provided via visible differences in the laser 1920, e.g., notches in the laser 1920. In one embodiment, as shown in FIG. 19B, when the head 1900 is selected (e.g., via the laser 1920), and there is an object behind the head 1900, the head 1900 may automatically become somewhat transparent such that the user can see the can 1910 behind the head 1900. As shown in FIG. 19C, when the head 1900 is moved (or the user moves his head and can therefore see the can 1910), the laser 1920 automatically takes on the single color 1921 and is not transparent. Thus, as shown in FIGS. 19A-19C, an invisible or obscured object may be automatically visually indicated to the user.

Figure 20:
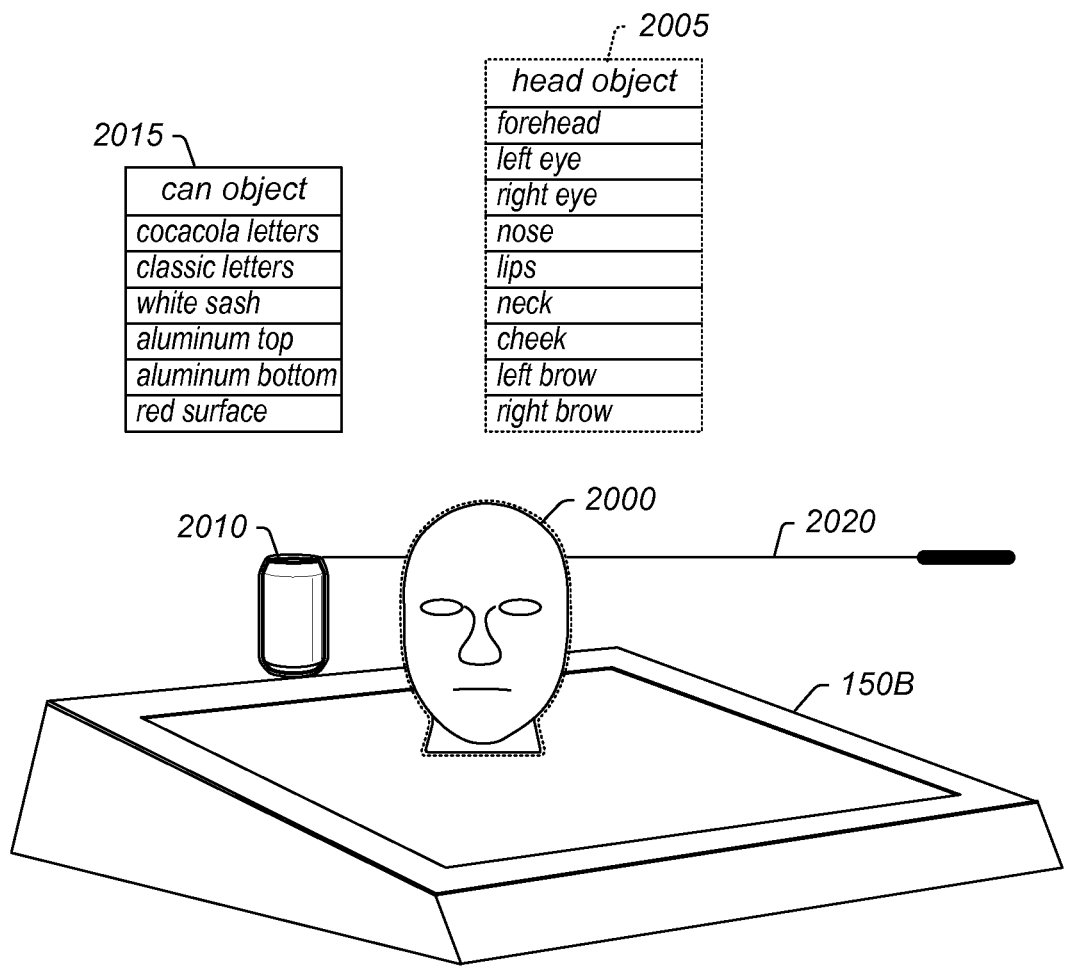

FIG. 20 illustrates a UI element or feature where a listing may be displayed which indicates a hierarchy of subobjects for a selected object. This hierarchy may indicate all of the subobjects that are currently selected (e.g., since the selected object). In the embodiment shown in FIG. 20, the head 2000 and the can 2010 are selected via the laser 2020. In response to this selection, corresponding listing 2005 is automatically shown which lists the subobjects associated with the head 2000 that are also selected, in this case, including forehead, left eye, right eye, nose, lips, neck, cheek, left brow, right brow. Similarly, a corresponding listing 2015 is automatically shown which lists the subobjects associated with the can 2010 that are also selected, in this case, the "Coca Cola" letters, "classic" letters, white sash, aluminum top, aluminum bottom, and red surface. By automatically showing this listing of subobjects, the user can see if something was accidentally de-selected when searching for another object to be selected. This list may be a table indicating object name or ID, location, and/or other metadata. The list may be color coded in a manner that allows each list to be easily identified with the corresponding object. For example, the head 2000 may have a yellow outline and the list 2005 may also have a yellow outline. Similarly, the can 2010 may have a purple outline and the list 2015 may also have a purple outline. Further, the lists or tables may be shown proximate to the corresponding object to indicate that they are associated with each other.

Figure 21A:
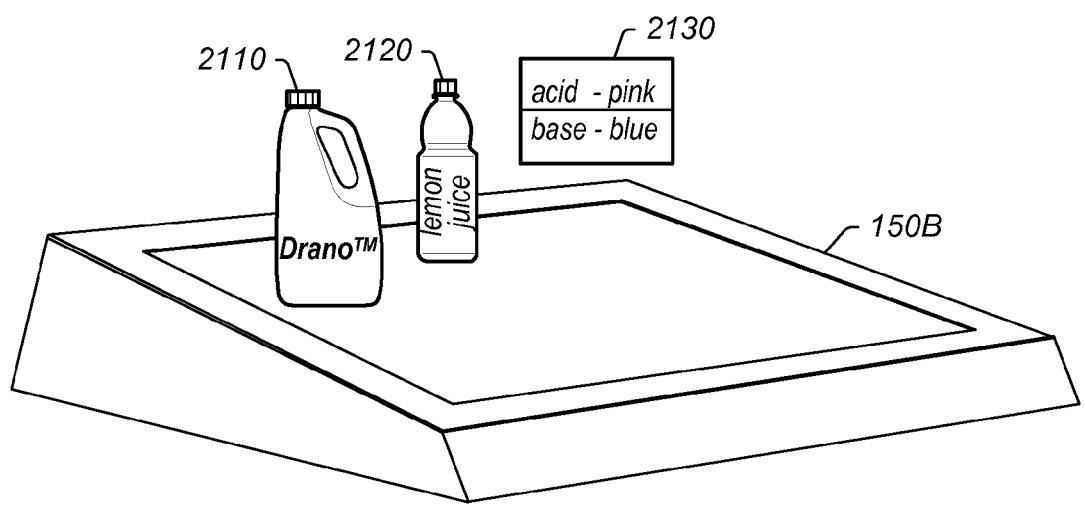
Figure 21B:
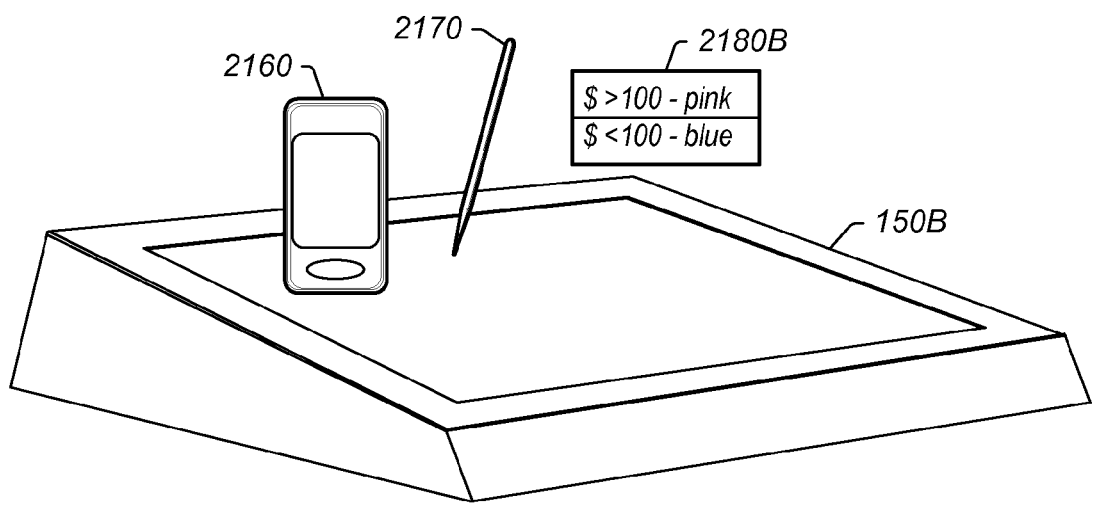

FIGS. 21A and 21B illustrate a UI element or feature where visual indications may be used to convey or indicate attributes or criteria of objects. For example, in the embodiment of FIG. 21A, a can of Drano™ 2110 and a bottle of lemon juice 2120 are shown on the display 150B. The user may be using a tool tip for testing acids and bases. Correspondingly, when the user selects the can of Drano™ 2110, the can may be automatically highlighted in blue or the beam selecting the can may be colored blue, indicating that the can contains a base. Similarly, when the user selects the bottle of lemon juice 2120, the bottle or beam may be automatically shown in pink, indicating that it is an acid. In some embodiments, there may be a legend or key 2130 displayed to assist the user in understanding these indications. Other types of indications are also envisioned, such as pop up visual indications, auditory output etc.

In the embodiment of FIG. 21B, visual indications may be used to indicate whether a threshold is reached. In this embodiment, the threshold may be whether the selected item costs more than 100 dollars. If the user selects the iPod™ 2160, then the visual indication (e.g. color) may indicate that the iPod™ 2160 is worth more than 100 dollars. If the user selects the pen 2170, then the visual indication may indicate that the pen is worth less than 100 dollars. Thus, visual indications may be used to convey attributes or comparison of associated data with criteria to the user.

Figure 22:
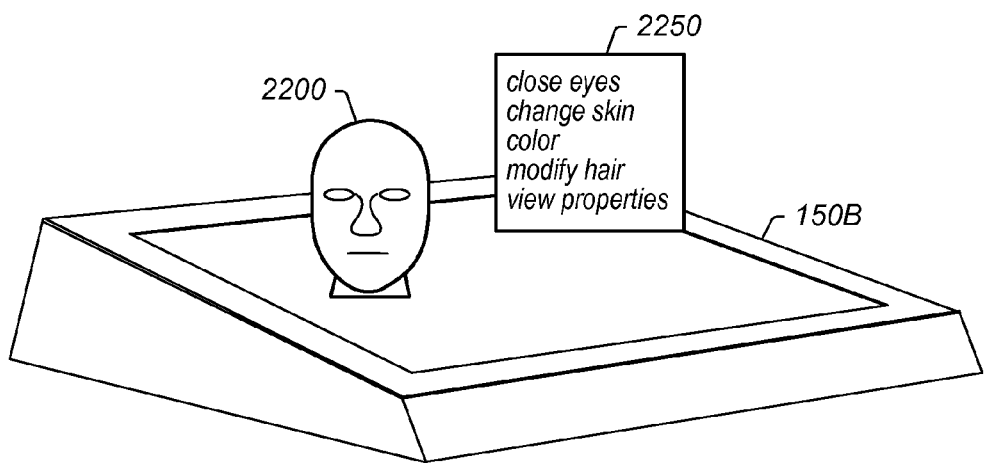

In the embodiment of FIG. 22, a popup window or control dashboard may be shown for an object. The popup window may be automatically displayed in response to selection, stylus position, user demand, tool function, etc. In the embodiment shown, the user may select head 2200 and window 2250 may automatically appear in response to the selection. As shown in this menu, the user may be able to perform various actions using the menu, such as "close eyes", "change skin color", "modify hair", "view properties", etc. Thus, a window that is used to interact with an object may be displayed in response to various input, e.g., to the object.

Figure 23:
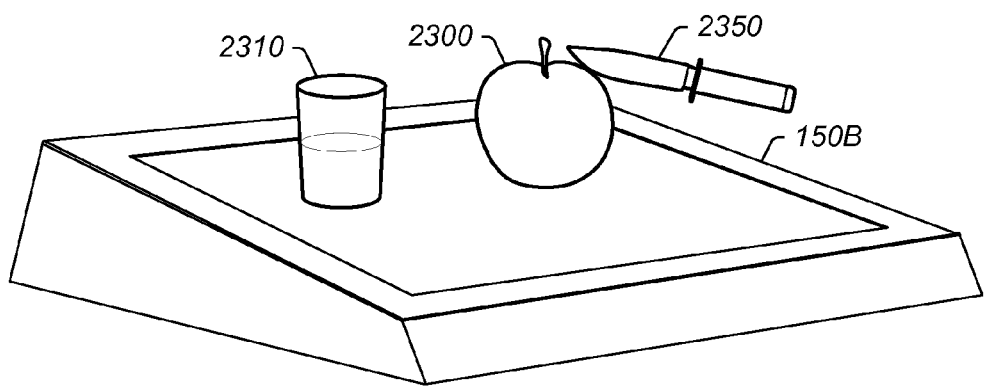

FIG. 23 illustrates an exemplary UI element or feature where tools may be activated or deactivated. As shown, the user may wish to use a knife tool 2350 on the apple 2300. Accordingly, a tool, such as knife tool 2350, may be automatically deactivated until the knife tool 2350 comes into range of the apple 2300. Thus, in some embodiments, a tool may be deactivated (e.g., based on selection) and then automatically activated once it reaches a target object and/or an object for which the tool is appropriate. Alternatively, the user may be able to selectively activate or deactivate the tool. Thus, where a tool, such as knife tool 2350, is deactivated, it will not interact with the glass of water 2310. When a tool, such as knife tool 2350, is activated, there may be feedback to the user (e.g., visual feedback), such as object highlighting, or other indications.

In further embodiments, the tool in use may automatically change based on its context. For example, if the user brings a laser or tool into proximity of the glass of water 2310, an eyedropper tool may be automatically selected, e.g., based on metadata of the glass or water object. Similarly, when the tool comes into proximity of the apple 2300, the knife tool 2350 may be automatically selected for use, e.g., based on metadata of the apple 2300. Thus, tools or functions of tools may be automatically selected based on proximity to various objects. Similar descriptions apply to the contexts of scenes or groups of objects, etc.

Figure 24:
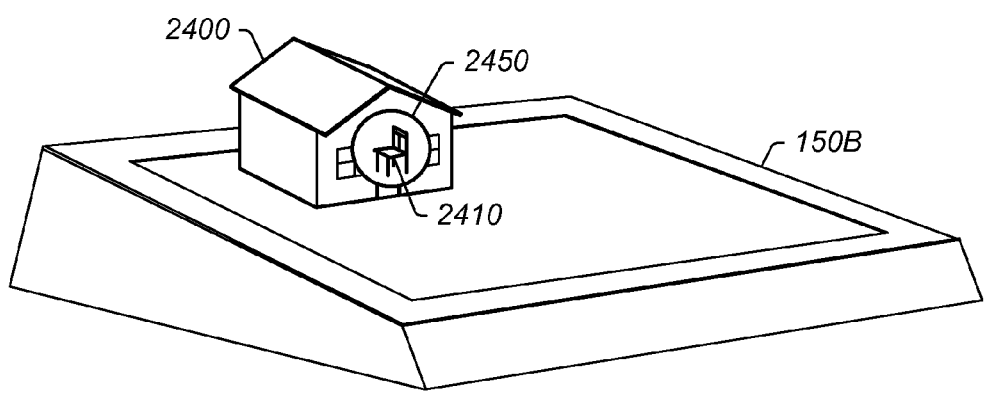

FIG. 24 illustrates an embodiment of a UI element where portions of the 3D scene may be made to become transparent, e.g., to allow the user to view the 3D scene in a new way. In the embodiment shown, house 2400 may normally be opaque, and the inside of the house 2400 may not be visible. The user may utilize a gradient tool 2450, which may make a portion of the 3D scene gradually transparent, so that the user may view objects inside the house 2400, such as the chair 2410. In the embodiment shown, the transparency may be within the circle or cone of the gradient tool 2450. When manipulated as a cone, the transparency may be higher at the base and lower at the point, thereby allowing the user to see inside objects. In some embodiments, this gradient of transparency may apply to the entire scene, such that objects at or near the base level are transparent and objects at or near the tip are opaque, regardless of where the objects are in the scene. Alternatively, this effect may slowly diffuse from the gradient tool's application. In these embodiments, a user could therefore use the tool to selectively view levels of objects in the 3D scene. Using the example of FIG. 24, by using the tool to see the chair 2410, the entire front of the house may become transparent such that the user could see the complete interior of the house. Thus, the gradient tool may allow the user to see more details of a desired object by making objects around it transparent. The tool may be used on single objects, subobjects, or groups of objects, as desired.

FIG. 25 illustrates an embodiment of a UI element where the user may manipulate the position and/or orientation of the 3D scene. In the particular embodiment shown, one or more of the displays, e.g. the horizontal display 150B, may include a physical control such as a slider or knob 2502, etc. that a user may use to manipulate the 3D scene. For example, the user may use the slider or knob 2502 to rotate the 3D scene and/or to raise or lower the 3D scene relative to the horizontal axis. Thus, this slider/knob 2502 input may act as a "virtual pedestal" where the object is displayed within the 3D scene. As shown, the user may move the slider/knob 2502 left to right to raise or lower an object within the 3D scene such as the soda can 2510 shown in FIG. 25. While the slider 2502 is shown as a physical control, various other controls or mechanisms for changing the orientation or position of the 3D scene are envisioned, such as software controls (virtual controls displayed within the 3D scene), which may be controlled via voice commands, gestures, user input devices, etc.

Figure 26A:
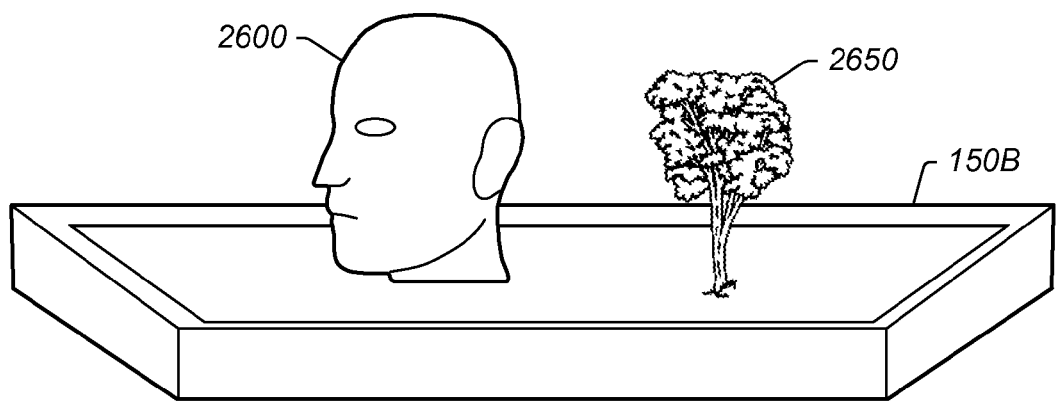
Figure 26B:
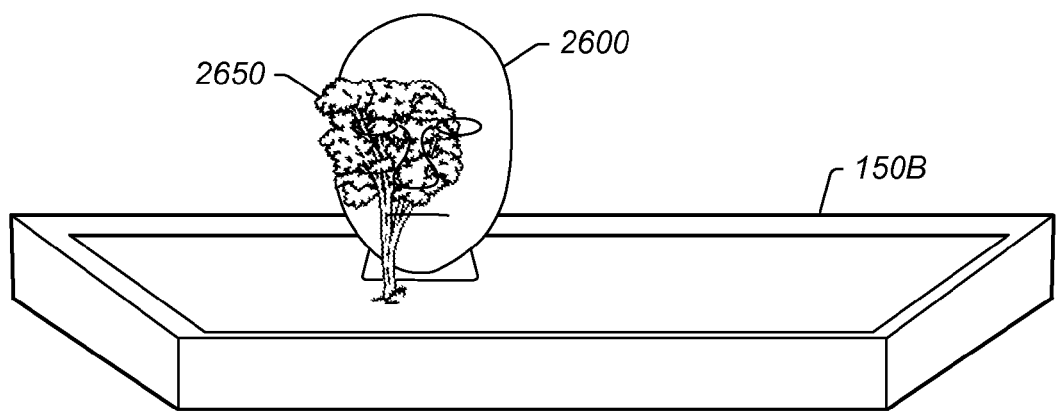

FIGS. 26A and 26B illustrate one embodiment of a UI element where the user can disable head/eye tracking for some objects, but leave on head/eye tracking for other objects. In FIG. 26A, the user may disable head/eye tracking for one or more objects, in this case the trees 2650, while head/eye tracking remains enabled for the head 2600. Accordingly, as the user moves his head from the front of the screen to the left side of the screen, the user is able to see the head 2600 from his changing point of view, but the trees 2650 stay in their originally rendered position throughout the movement. Thus, if head tracking were on for all of the objects, the trees 2650 would not be in front of the head as shown in FIG. 26B, but instead would be behind and to the right of the head 2600. The user may enable this UI element via a special selection of an object and/or gesture (such as a vertical stylus position on the trees 2650 while moving his head) and/or via other means. For example, the user may hold a special button or touch a touchpad to make a selected object (or object that the user is looking at) lose or retain head tracking rendering. In some embodiments, this feature may be inferred automatically by the user's head or eye movements. This UI element may be augmented by including appropriate highlighting of objects that are enabled or disabled while the user is changing his head position.

Further head gestures are envisioned. For example, if the user moves his head quickly (e.g., with an acceleration above a threshold), the 3D scene may be re-rendered for a position further than where his head "ends up" after the movement. For example, if the user slowly moved around the display to look around an object (similar to the head 2600 in FIGS. 26A and 26B), the re-rendering of the 3D scene would have a 1:1 correspondence with his actual head movement; however, if the user quickly moved around the display, the 3D scene may be rotated further than where his head "ended up" after the movement. Thus, the 1:1 correspondence of the head movement to 3D scene rendering may be changed when the user moves above or below a threshold, as desired. After the user ends this head gesture (e.g., by being still for an amount of time, such as one second), the 1:1 correspondence may be reinstated. Thus, during quick movement of the head, the 3D scene may be updated with a preprogramed motion, based on the head movement speed. The direction and type of head movement detected may be used as input to select an appropriate rendering response, e.g., from a table of rendering responses.

FIG. 27 illustrates one embodiment of a UI element where a graphical book 2720 indicates the current position among a plurality of selections. More particularly, the graphical book 2720 may show the current selection on the present page, and the thickness of the book 2720 prior to and after the selection may represent the relative percentage of options prior to and after the selection in the display list. As shown, the user may have selected head 2700, e.g., with laser 2750. Correspondingly, a list of subobjects of the head object is displayed in a graphical list 2710. As shown, the current selection is "right eye" which is 33% down on the list. A graphical book 2720 is shown which shows the "right eye" as the current selection, and also indicates that the book 2720 is open at a point that is 33% of the entirety, which corresponds to the list. Thus, the book 2720 provides a graphical indication of the current selection with respect to the previous and remaining selections. Such graphical indications may be particularly useful when there are many possible selections, e.g., more than can be displayed at once. Additionally, while a book indication is shown in this image, other possibilities are envisioned, such as a scroll bar, a glass of water, or textual indications, such as a percentage sign, among other variants.

FIGS. 28A-28F illustrate various embodiments of the use of rulers as UI elements. Rulers may be used to provide the user with feedback of the scale of what he his viewing in a 3D scene. Rulers may be associated with an object (or group of objects), with the display, and/or with the user's point of view, as desired. In the embodiment of FIGS. 28A and 28B, the rulers for each axis (2850x, 2850y, and 2850z) are shown as being associated with the display 150B rather than the head 2800, the viewpoint of the user, and/or the scene. Thus, as the scene is rotated, the rulers stay in their original position with respect to the display 150B. In the embodiment of FIGS. 28C and 28D, the rulers are associated with the head 2800. Thus, as the head rotates from FIG. 28C to FIG. 28D, the rulers also automatically rotate (but may change their appearance or orientation so as to continue to be readable). In the instance where the entire 3D scene rotated, and the rulers rotated with the scene, the rulers would be associated with the 3D scene. However, where only the head 2800 rotated and the rulers rotated with the head 2800, the rulers would be associated with the head 2800. Similar descriptions apply to rulers associated with groups of objects. In the embodiment of FIGS. 28E and 28F, the rulers may be associated with the user's point of view (i.e., the user's viewpoint). Thus, as the user's head moves from the front of the screen to the left diagonal of the screen, the rulers move to follow the user's viewpoint. Thus, the rulers displayed in the 3D scene may only move with respect to various possible objects or entities, such as the scene, the user's point of view, an object, a group of objects, etc. The rulers may also follow the stylus (or other user input device). Thus, the rulers may have a fixed origin or may be configured to float with respect to objects or points of view.

Further, as the 3D scene or object is scaled, the rulers may be dynamic, e.g., automatically changing their units and increasing resolution as desired. For example, if the user is viewing the head 2800 and the rulers are showing a scale of inches (e.g., with ¼" increments), as the user zooms in, the rulers may automatically change their scale to including more increments (e.g., with 1/16" increments). Further, the rulers may automatically change their unit of measure (e.g., from centimeters to millimeters). The user may also be able to switch between physical units of measure (e.g., inches) to other units of measure, such as pixels. In further embodiments, other measurements may be shown in the 3D scene, e.g., measures of liquid, weight, specific gravity, etc. Further, multiple rulers may be displayed and may each be tied to different objects, which may be of different scales.

Figure 29:
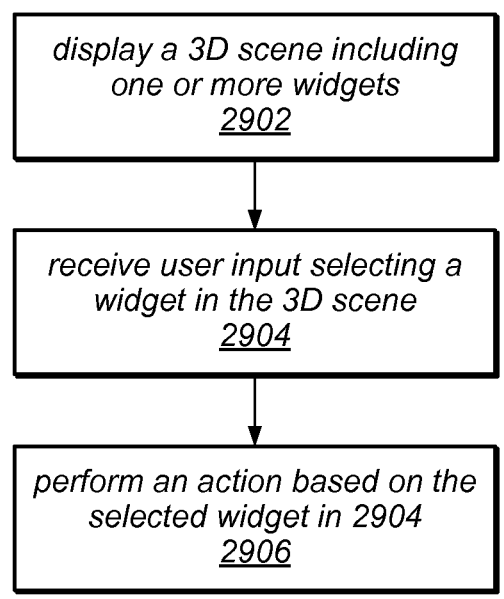
FIG. 29 is a flowchart diagram illustrating one embodiment of a method for selecting an object from a plurality of available objects.

FIG. 29—Selectable Objects

FIG. 29 illustrates a method for selecting and using selectable objects (or viewable widgets) within a 3D scene. The method shown in FIG. 29 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 2902, a 3D scene may be presented, similar to 602, described above.

Presenting the 3D scene may include presenting one or more selectable objects. The selectable objects may be referred to as "widgets" or "icons" that are provided as selectable stereoscopic objects within the 3D scene. For example, they may be provided within the 3D scene similar to the objects shown in FIG. 16. While the palette in FIG. 16 may be either presented as 2D or 3D objects, the widgets of 2902 may be preferably presented as stereoscopic 3D objects.

However, they may be presented in such a way so that a user does not confuse the widgets as "normal" objects of the 3D scene, but instead as objects used for interaction, such as for performing desired actions. In some embodiments, this may be achieved by only displaying the widgets when the user invokes their display, e.g., by positioning a stylus in a certain area of the screen (e.g., positioning a cursor or stylus where the widgets typically appear for a certain amount of time), providing a designated gesture (e.g., via the stylus, touch pad, or other mechanism), providing a designated key combination, etc. However, in other embodiments, the widgets may be displayed all the time or most of the time, but may be displayed in such a manner that the user understands their function. For example, the widgets may be displayed along a side of the 3D scene and may not change their appearance while the rest of the 3D scene changes (e.g., in response to various stimuli, such as those provided by the user, while a 3D scene is played, etc.). Thus, these widgets may be displayed in a manner to indicate different functionality or behavior than other objects in the 3D scene.

These widgets may be selectable by the user to perform a desired action. For example, in FIGS. 30A-30E below, the widgets may be selectable to spawn further widgets, each of which may be selectable for including an object within the 3D scene. However, other actions may be performed after selecting the widget. For example, one of the widgets may be used to select a specific tool to be used by the user (e.g., a paint brush, pencil, selecting object, scalpel, etc.). As another example, the widgets may be selectable to perform an action to the 3D scene, e.g., begin playback of the 3D scene, stop playback of the 3D scene, invoke a physics engine, clear the 3D scene, open a new 3D scene, open an application, close an application, etc. Thus, according to various embodiments, these widgets may be selectable to perform any desired action.

The widgets may have one or more of the following properties:

The widgets may be generated and/or displayed based on a first viewpoint (e.g., an eyepoint of the user viewing the 3D scene). For example, if the widgets have a preferred orientation, they may be facing or oriented toward the first viewpoint. In further embodiments, the widgets may be presented so that they are viewable by the user, e.g., they are not obstructed by other objects. Additionally, the widgets may be provided at an angle that is perpendicular to the viewpoint's line of sight. Accordingly, the widget may be presented on a plane or at an angle (relative to the first viewpoint) that is different than the display's plane or angle.

However, in other embodiments, the widget may be presented based on the display, e.g., on the same plane of the display, at zero parallax, etc. As another example, the perspective of the widgets may vary depending on the display. For example, for a vertical display, the widgets may be provided in a vertical or central perspective. For a horizontal display, the widgets may be provided in a horizontal or angled perspective. In other embodiments, the perspective may only depend on the angle of the viewpoint's line of sight relative to the display. Further, for a vertical display, the widgets may be presented in front of the display, while for a horizontal or angled display, the widgets may be presented above the display.

Additionally, as indicated above, the widgets may be viewable at all times, some of the time, in response to user input, etc. For example, a user action may be used to cause the widgets to come into view or come out of view, as desired.

In 2904, user input may be received to select a first widget of the one or more widgets, and, in 2906, an action may be performed based on the selection of the first widget. More specifically, the action(s) associated with the first widget may be performed.

In one embodiment, as indicated above, the widgets may be extensible by nature. For example, upon action on a widget, subsequent widgets (and potentially subsequent subwidgets) may be presented in a contiguous manner, noncontiguous manner, disassociated manner, or correlated graphic manner, as desired. For example, the widgets may extend like a set of building blocks that build onto a structure. In another example, the widgets may extend as parts of a drawing or image or extend to form a geometric pattern. In another example, the widget may extend in a form similar to a selected or nearby object.

Thus, selection of the first widget may result in presentation of additional widgets, each of which may be selected to perform a desired action. FIGS. 30A-30E provide an example illustrating such an embodiment.

In these embodiments, each of the initial widgets may be considered a "menu" that when invoked presents a plurality of menu items (the additional widgets), that may be selectable to perform an action.

FIGS. 30A-30E—Exemplary Screen Shots Corresponding to FIG. 29

Figure 30A:
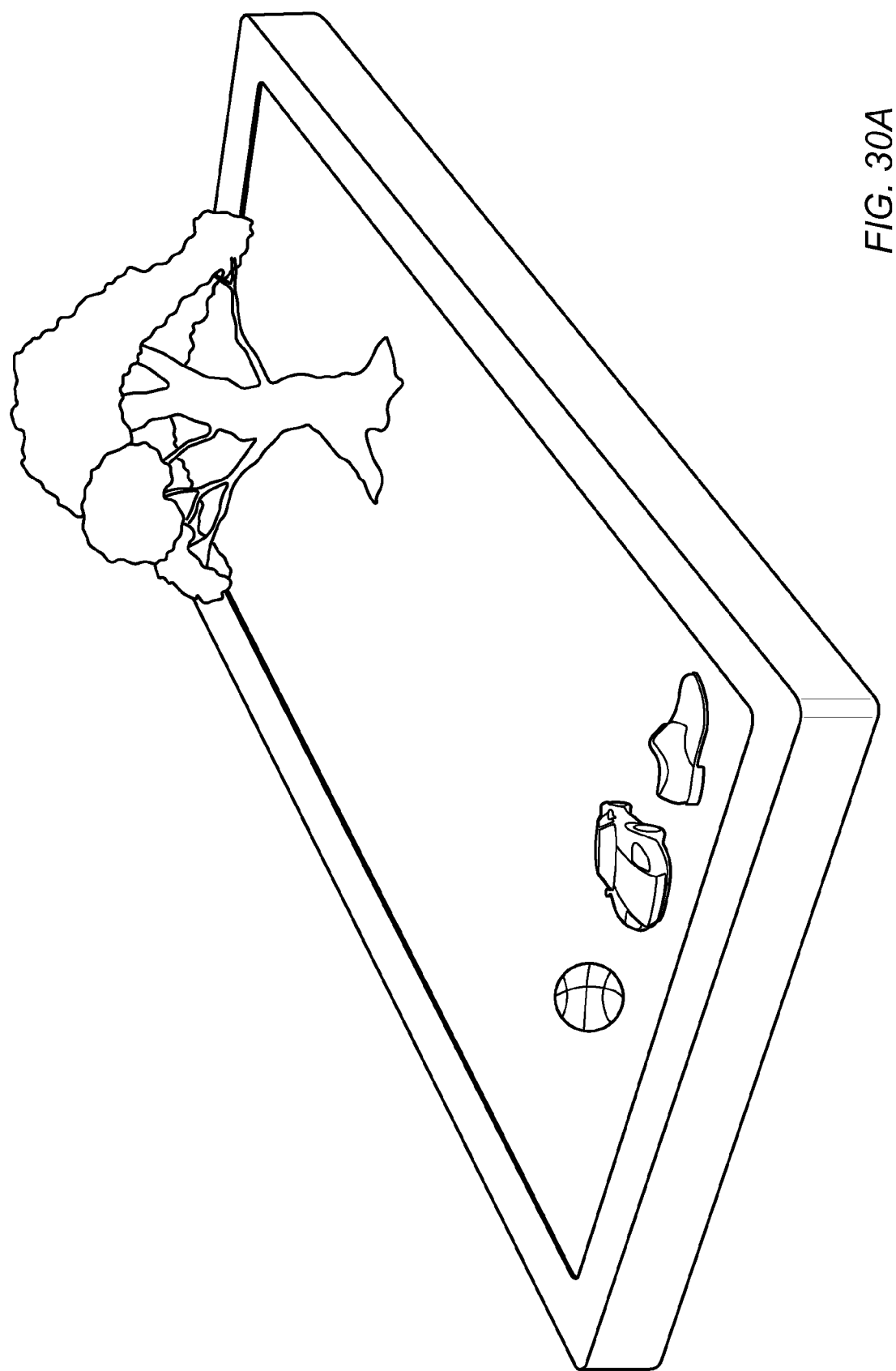
FIGS. 30A-30E are exemplary screen shots corresponding to the method of FIG. 29.
Figure 30B:
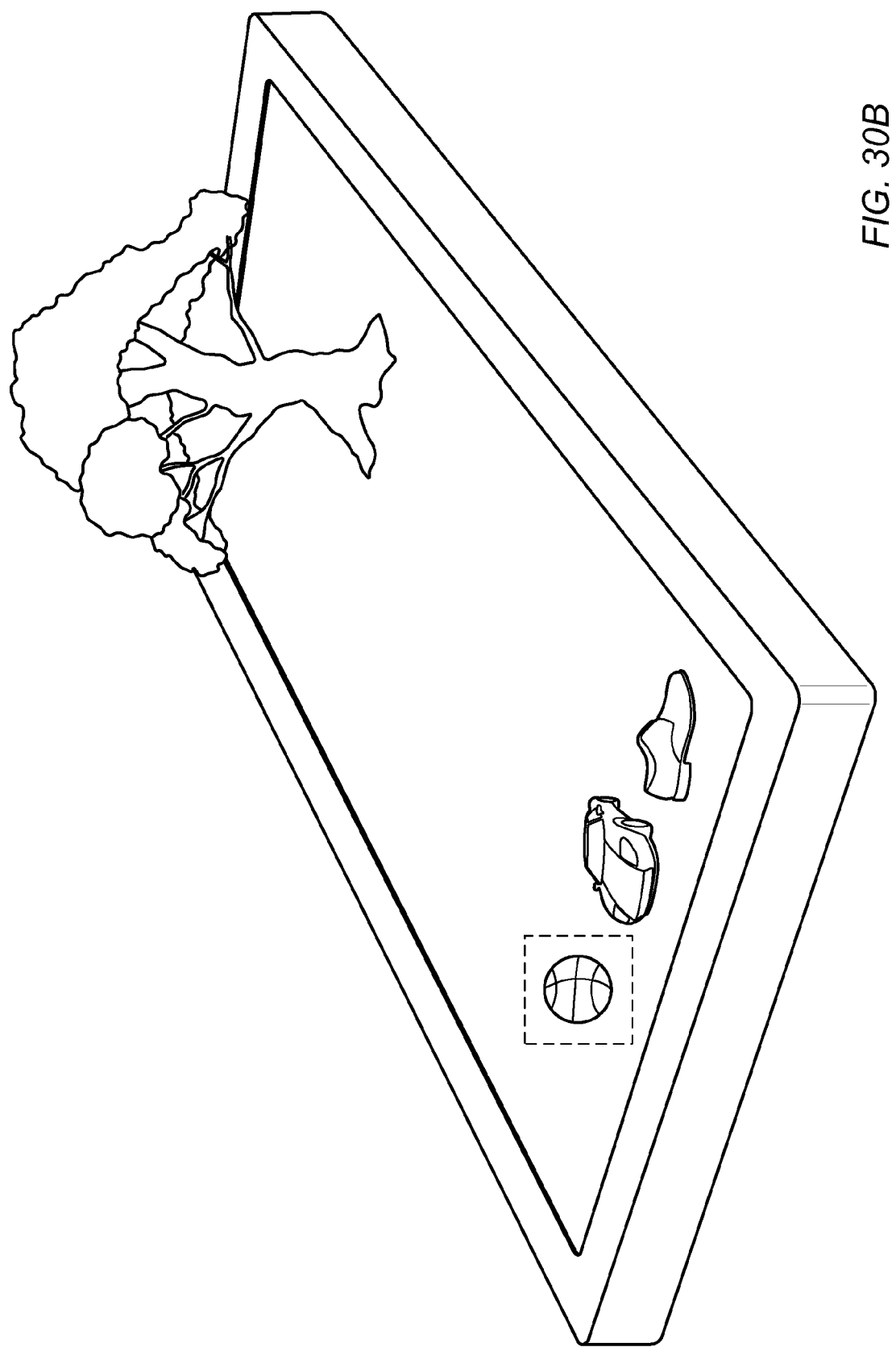
Figure 30C:
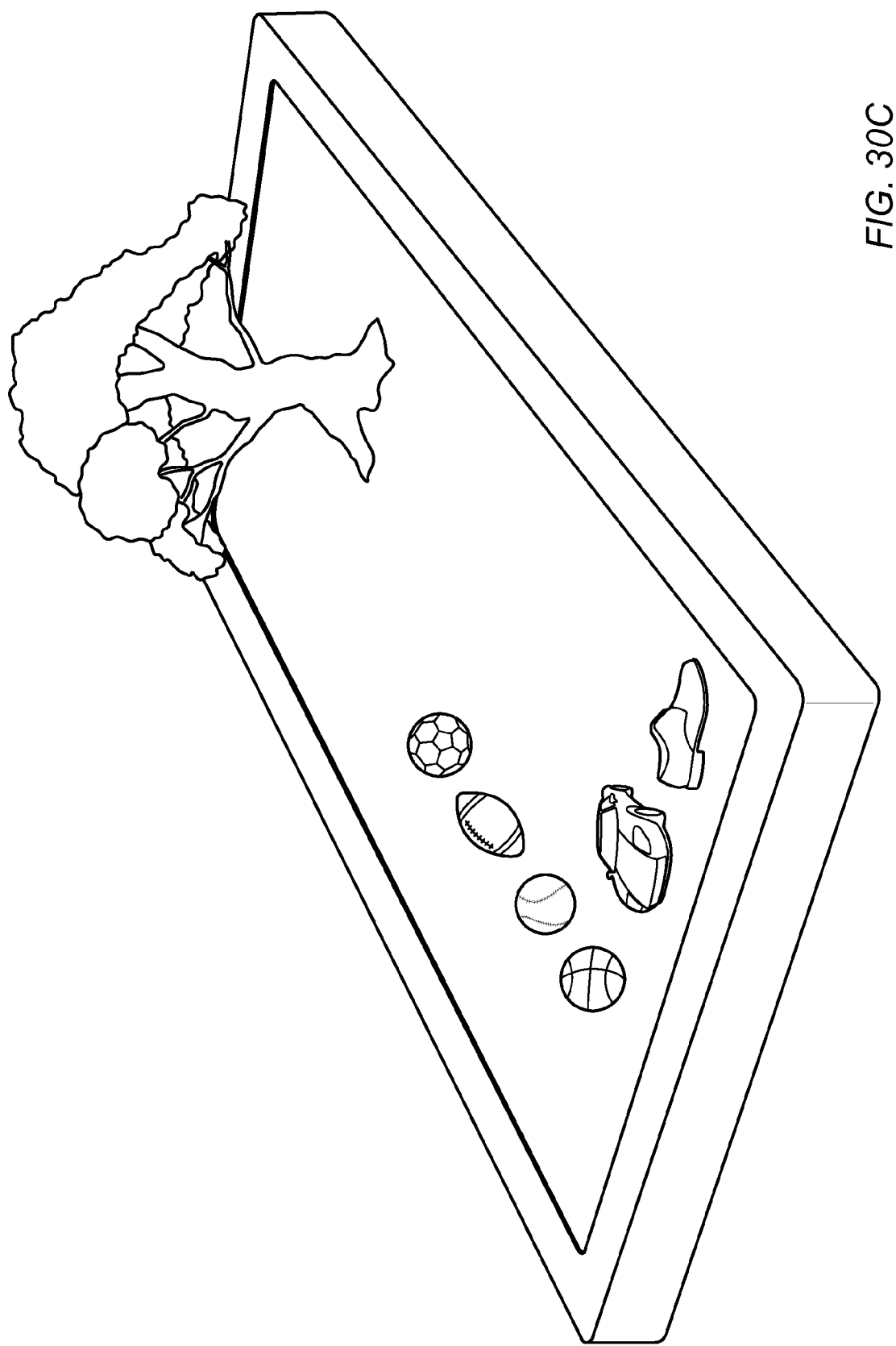
Figure 30D:
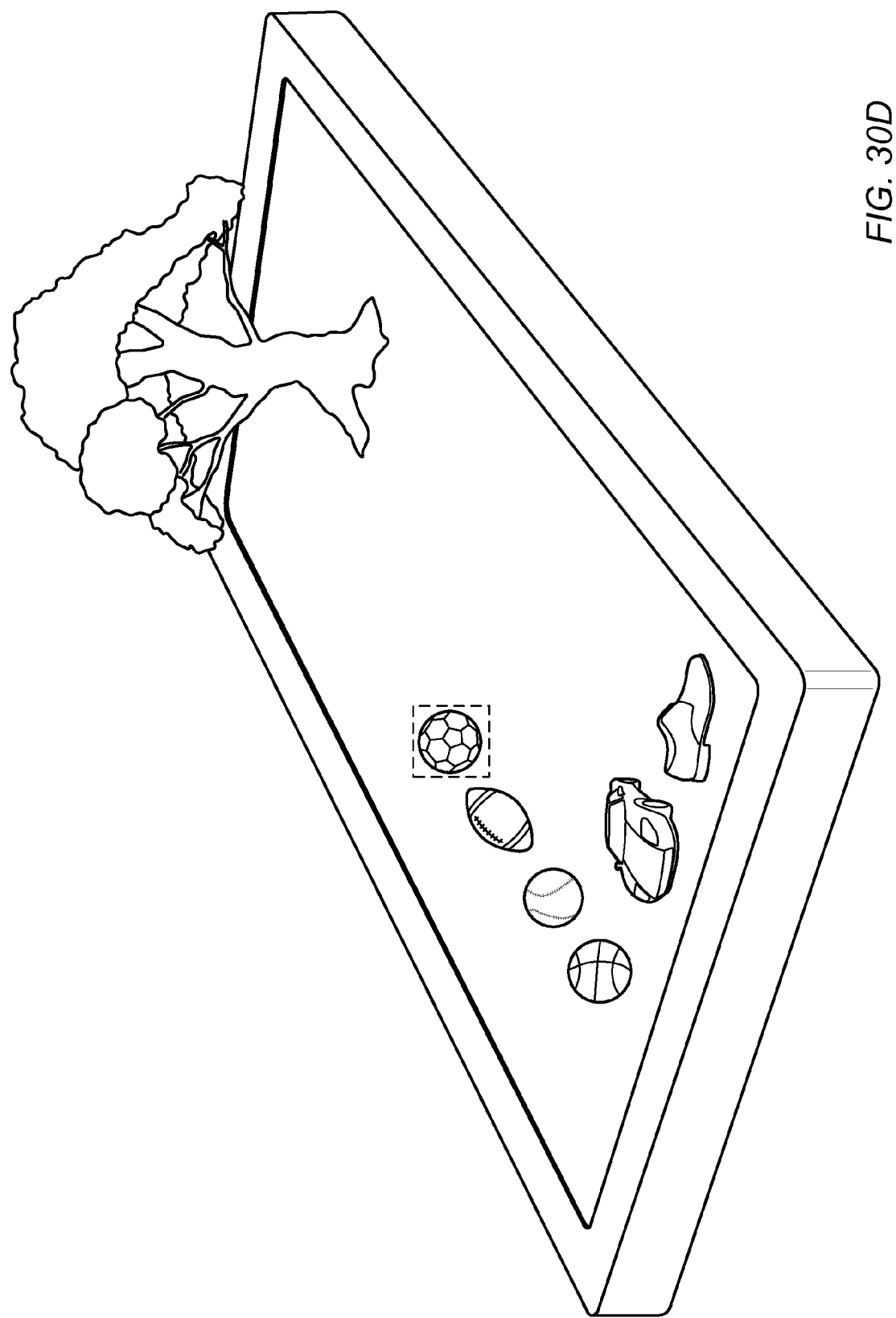
Figure 30E:
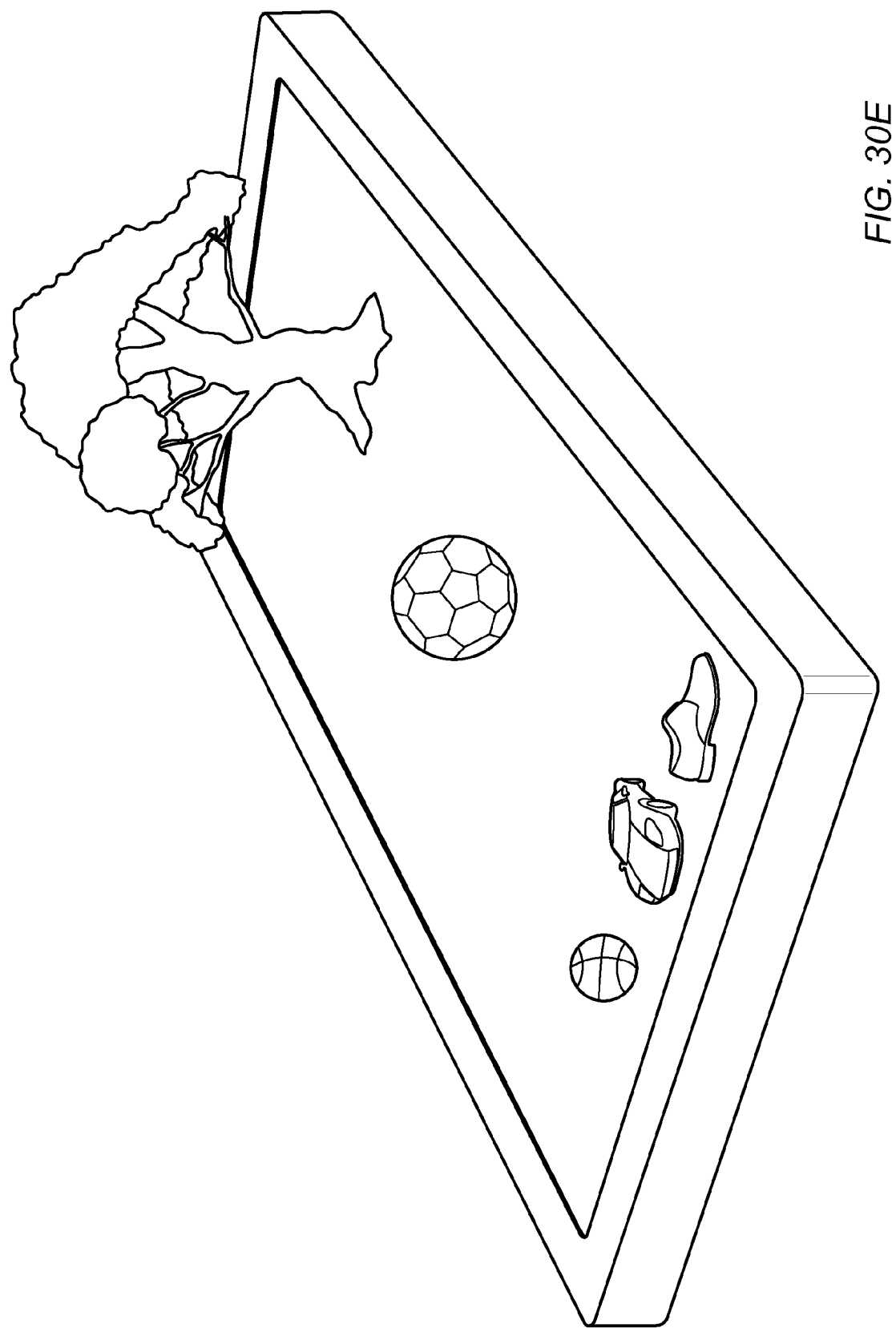

FIGS. 30A-30E are exemplary screen shots corresponding to FIG. 29. As shown in FIG. 30A, an exemplary display is presenting a 3D scene including 3D object (a tree) and a plurality of widgets (a basketball, a car, and a shoe). As shown, these widgets are presented as smaller objects along the left side of the display indicating to the user that they are different from the main objects in the 3D scene, such as the tree. Accordingly, a user may use a selection device (e.g., a stylus) to select one of these widgets. Upon selection of the basketball (as shown in FIG. 30B), a plurality of additional widgets are presented, including a baseball, a football, and a soccer ball (as shown in FIG. 30C). Each of these objects are selectable for inclusion in the 3D scene. In the example of FIG. 30D, the user has selected the soccer ball. Accordingly, in FIG. 30E, the soccer ball is included in the 3D scene with the tree, and the widgets along the left side have returned to the configuration of FIG. 30A. As shown in FIG. 30E, the soccer ball has taken on a larger (e.g., more realistic) size than the selectable widget shown in FIGS. 30C and 30D.

Further Embodiments

In one embodiment, a specific zooming effect may be controllable by the user. For example, instead of moving an object of interest towards the user's point of view (which would be similar to the user moving forward for closer inspection), another zoom effect is to increase the stereoscopic effect, which is effectively increasing the interocular distance in the rendering engine. This causes the left and right images to gradually scale their relative perspectives and gives the user a stereo zooming effect equivalent to gradually occurring stereo fish-eye view, which is different than simply moving the object closer to the user. This effect may be triggered via any of various user input mechanisms or automatically, as desired.

In some embodiments, the user may be able to selectively switch between two different points of view. For example, the user may be able to switch between a first and third person perspective of his avatar. Alternatively, the user may able to simply specify another point of view and switch between viewing a current point of view and the specified point of view. This tool would also allow a user to inhabit and see the 3D scene through the perspective of other objects or avatars that have allowed access to their point of view, or vantage point.

In one embodiment, a second perspective may be provided within a first perspective. For example, a central perspective projection may be provided within a horizontal projection display, such as a standup picture frame displayed as projecting from a horizontal display surface, and the picture frame may depict a central perspective video). Additionally, a view of a 3D scene may be provided within the 3D scene. The view may be stereoscopic or monoscopic, as desired. Further descriptions regarding the changes of points of view, multiple perspectives, and views within a 3D scene are provided in U.S. patent application Ser. No. 12/797,958, which was incorporated by reference in its entirety above.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method comprising:
    displaying a three dimensional (3D) stereoscopic scene by at least one stereoscopic display device wherein the 3D stereoscopic scene is displayed according to a first viewpoint, wherein the first viewpoint comprises a first location and orientation in physical space with respect to the at least one stereoscopic display device, and wherein the 3D stereoscopic scene comprises a rendering of two or more objects from the first viewpoint in which the rendering of a first object of the two or more objects is at least partially visible and the rendering of a second object of the two or more objects is at least partially obscured by the first object;
    determining a second location and orientation in physical space of a six degree of freedom (6DOF) input device, wherein the second location and orientation in physical space maps to a corresponding position and orientation within the 3D stereoscopic scene;
    displaying a depicted beam according to a first representation;
    determining an intersection of the depicted beam within the 3D stereoscopic scene with an obscured portion of the second object of the two or more objects, wherein the depicted beam extends from the corresponding position and orientation within the 3D stereoscopic scene; and
    displaying at least a portion of the depicted beam with a representation that indicates the intersection, comprising:
        displaying a first portion of the depicted beam with the first representation; and
        displaying a second portion of the depicted beam with a second representation;
        wherein the first portion extends from the corresponding position and orientation within the 3D stereoscopic scene towards the intersection, wherein the second portion extends away from the intersection, and wherein the second representation is different from the first representation.

2. The method of claim 1,
    wherein the first representation comprises one or more of:
        a first line style; or
        a first line color; and
    wherein the second representation comprises one or more of:
        a second line style; or
        a second line color.

3. The method of claim 2,
    wherein the first line style comprises a solid line and the second line style comprises a notched line.

4. The method of claim 1, further comprising:
    rendering the first object transparent or translucent; and
    displaying the partially obscured portion of the second object from the first viewpoint.

5. The method of claim 1, further comprising:
    determining a region of the first object that corresponds to the partially obscured portion of the second object;
    rendering the region of the first object transparent; and
    displaying the partially obscured portion of the second object from the first viewpoint.

6. The method of claim 1, further comprising:
    determining a region of the first object that corresponds to the partially obscured portion of the second object;
    rendering the region of the first object translucent; and
    displaying the partially obscured portion of the second object from the first viewpoint.

7. The method of claim 1,
    wherein the depicted beam comprises a rendering of a continuous beam.

8. A non-transitory computer accessible memory medium storing program instructions for utilizing a six degree of freedom (6DOF) input device with a three-dimensional (3D) stereoscopic scene, wherein the program instructions are executable by a processor to:
    display the 3D stereoscopic scene by at least one stereoscopic display device, wherein the 3D stereoscopic scene is displayed according to a first viewpoint, wherein the first viewpoint comprises a first location and orientation in physical space with respect to the at least one stereoscopic display device, and wherein the 3D stereoscopic scene comprises a rendering of two or more objects from the first viewpoint in which the rendering of a first object of the two or more objects is at least partially visible and the rendering of a second object of the two or more objects is at least partially obscured by the first object;
    determine a second location and orientation in physical space of the 6DOF input device, wherein the second location and orientation in physical space maps to a corresponding position and orientation within the 3D stereoscopic scene;
    display a depicted beam according to a first representation;
    determine an intersection of the depicted beam within the 3D stereoscopic scene with an obscured portion of the second object of the two or more objects, wherein the depicted beam extends from the corresponding position and orientation within the 3D stereoscopic scene; and
    display at least a portion of the depicted beam with a representation that indicates the intersection, wherein to display at least the portion of the depicted beam, the program instructions are further executable to:
        display a first portion of the depicted beam with the first representation; and
        display a second portion of the depicted beam with a second representation;
        wherein the first portion extends from the corresponding position and orientation within the 3D stereoscopic scene towards the intersection, wherein the second portion extends away from the intersection, and wherein the second representation is different from the first representation.

9. The non-transitory computer accessible memory medium of claim 8, wherein the depicted beam comprises a rendering of a continuous beam.

10. The non-transitory computer accessible memory medium of claim 8, wherein the first representation comprises a first line style and the second representation comprises a second line style.

11. The non-transitory computer accessible memory medium of claim 10,
    wherein the first line style comprises a solid line and the second line style comprises a notched line.

12. The non-transitory computer accessible memory medium of claim 8, wherein the first representation comprises a first line color and the second representation comprises a second line color.

13. The non-transitory computer accessible memory medium of claim 8, wherein the program instructions are further executable to:
  determine a region of the first object that corresponds to the partially obscured portion of the second object;
  render the region of the first object transparent; and
  display the partially obscured portion of the second object from the first viewpoint.

14. The non-transitory computer accessible memory medium of claim 8, wherein the program instructions are further executable to:
  determine a region of the first object that corresponds to the partially obscured portion of the second object;
  render the region of the first object translucent; and
  display the partially obscured portion of the second object from the first viewpoint.

15. The non-transitory computer accessible memory medium of claim 8, wherein the program instructions are further executable to:
  render the first object transparent; and
  display the partially obscured portion of the second object from the first viewpoint.

16. The non-transitory computer accessible memory medium of claim 8, wherein the program instructions are further executable to:
  render the first object translucent; and
  display the partially obscured portion of the second object from the first viewpoint.

17. A system for utilizing a six degree of freedom (6DOF) input device with a three-dimensional (3D) stereoscopic scene, the system comprising:
  a processor;
  an input device configured to provide information to the processor indicating a current viewpoint of the user;
  at least one display coupled to the processor;
  the 6DOF input device; and
  a memory medium coupled to the processor which stores program instructions executable to:
    display the 3D stereoscopic scene by at least one stereoscopic display device, wherein the 3D stereoscopic scene is displayed according to a first viewpoint, wherein the first viewpoint comprises a first location and orientation in physical space with respect to the at least one stereoscopic display device, and wherein the 3D stereoscopic scene comprises a rendering of two or more objects from the first viewpoint in which the rendering of a first object of the two or more objects is at least partially visible and the rendering of a second object of the two or more objects is at least partially obscured by the first object;
    determine a second location and orientation in physical space of the 6DOF input device, wherein the second location and orientation in physical space maps to a corresponding position and orientation within the 3D stereoscopic scene;
    display a depicted beam according to a first representation;
    determine an intersection of the depicted beam within the 3D stereoscopic scene with an obscured portion of the second object of the two or more objects, wherein the depicted beam extends from the corresponding position and orientation within the 3D stereoscopic scene; and
    display at least a portion of the depicted beam with a representation that indicates the intersection, wherein to display at least the portion of the depicted beam, the program instructions are further executable to:
      display a first portion of the depicted beam with the first representation; and
      display a second portion of the depicted beam with a second representation;
      wherein the first portion extends from the corresponding position and orientation within the 3D stereoscopic scene towards the intersection, wherein the second portion extends away from the intersection, and wherein the second representation is different from the first representation.

18. The system of claim 17, wherein the depicted beam comprises a rendering of a continuous beam.

19. The system of claim 17, wherein the first representation comprises a first line style and the second representation comprises a second line style.

20. The system of claim 17, wherein the first representation comprises a first line color and the second representation comprises a second line color.

21. The system of claim 17, wherein the program instructions are further executable to:
  determine a region of the first object that corresponds to the partially obscured portion of the second object;
  render the region of the first object transparent; and
  display the partially obscured portion of the second object from the first viewpoint.

22. The system of claim 17, wherein the program instructions are further executable to:
  determine a region of the first object that corresponds to the partially obscured portion of the second object;
  render the region of the first object translucent; and
  display the partially obscured portion of the second object from the first viewpoint.

23. The system of claim 17, wherein the program instructions are further executable to:
  render the first object transparent; and
  display the partially obscured portion of the second object from the first viewpoint.

24. The system of claim 17, wherein the program instructions are further executable to:
  render the first object translucent; and
  display the partially obscured portion of the second object from the first viewpoint.

25. The system of claim 19,
  wherein the first line style comprises a solid line and the second line style comprises a notched line.

* * * * *